US 010275355B2

United States Patent
Huang et al.

(10) Patent No.: US 10,275,355 B2
(45) Date of Patent: Apr. 30, 2019

(54) METHOD AND APPARATUS FOR CLEANING FILES IN A MOBILE TERMINAL AND ASSOCIATED MOBILE TERMINAL

(71) Applicant: Cheetah Mobile Inc., Grand Cayman (KY)

(72) Inventors: Ruimin Huang, Beijing (CN); Ming Xu, Beijing (CN)

(73) Assignee: CHEETAH MOBILE INC., Grand Cayman (KY)

( * ) Notice: Subject to any disclaimer, the term of this patent is extended or adjusted under 35 U.S.C. 154(b) by 177 days.

(21) Appl. No.: 14/536,347

(22) Filed: Nov. 7, 2014

(65) Prior Publication Data

US 2015/0134913 A1     May 14, 2015

(30) Foreign Application Priority Data

Nov. 14, 2013   (CN) .......................... 2013 1 0566431

(51) Int. Cl.
     *G06F 12/12*        (2016.01)
     *G06F 9/312*        (2018.01)
     (Continued)

(52) U.S. Cl.
     CPC ........ *G06F 12/0833* (2013.01); *G06F 12/121* (2013.01); *G06F 2212/62* (2013.01)

(58) Field of Classification Search
     CPC ......... G06F 17/30053; G06F 17/30126; G06F 21/6218; G06F 17/30283; G06F 17/30412;

(Continued)

(56) References Cited

U.S. PATENT DOCUMENTS 8,938,492 B1 *  1/2015  Kelly ................ G06F 17/30905
                                                 709/203
2003/0182500 A1 *  9/2003  Raves ................ G06F 12/0866
                                               711/113

(Continued)

OTHER PUBLICATIONS https://web.archive.org/web/20131101063521/http://macpaw.com:80/cleanmymac-classic; Nov. 1, 2013.*

(Continued)

*Primary Examiner* — David Yi
*Assistant Examiner* — Candice A Rankin
(74) *Attorney, Agent, or Firm* — Morgan, Lewis & Bockius LLP

(57) ABSTRACT

A method for cleaning files stored in a mobile terminal is disclosed. The mobile terminal receives a file cleaning instruction from a user. In response to the file cleaning instruction, the mobile terminal identifies cache files based on the cache files' associated information and past user activities on the cache files and groups the identified cache files and their associated information into multiple cache file categories. At least one of the multiple cache file categories is located in an extended storage device of the mobile terminal (e.g., a SD card). Next, the mobile terminal displays information of the multiple cache file categories on the display, each cache file category having an associated file cleaning option and cleans at least one of the multiple cache file categories from the mobile terminal in accordance with a user choice of the corresponding file cleaning option.

19 Claims, 8 Drawing Sheets

(51) Int. Cl.
  *G06F 12/0831*   (2016.01)
  *G06F 12/121*   (2016.01)

(58) Field of Classification Search
  CPC ............ G06F 17/302; G06F 17/30265; G06F 17/30268; G06F 17/30699; G06F 2212/62; G06F 17/30082; G06F 17/3053; G06F 17/30115; G06F 12/0871; G06F 13/18; G06F 17/30132; G06F 2212/6042; G06F 21/602; G06F 2221/2143; G06F 17/30554; G06F 21/6209; G06F 2201/80; G06F 17/30156; G06F 17/3089; H04L 65/105; H04N 21/25891; H04N 2201/3225; H04N 2201/3229
  See application file for complete search history.

(56) References Cited

U.S. PATENT DOCUMENTS

| | | | | |
|---|---|---|---|---|
| 2005/0262148 | A1* | 11/2005 | Davitt | G06Q 10/00 |
| 2007/0180194 | A1* | 8/2007 | Graham | G06F 11/1658 |
| | | | | 711/133 |
| 2008/0162821 | A1* | 7/2008 | Duran | G06F 12/0866 |
| | | | | 711/133 |
| 2012/0144302 | A1* | 6/2012 | Campanotti | G06F 17/30038 |
| | | | | 715/716 |
| 2013/0205366 | A1* | 8/2013 | Luna | H04L 63/101 |
| | | | | 726/1 |
| 2014/0115003 | A1* | 4/2014 | Paymal | G06F 21/6227 |
| | | | | 707/784 |
| 2014/0325120 | A1* | 10/2014 | Park | G11C 13/003 |
| | | | | 711/103 |
| 2014/0365449 | A1* | 12/2014 | Chambliss | G06F 17/30303 |
| | | | | 707/692 |

OTHER PUBLICATIONS https://dl.macpaw.com/manuals/CleanMyMacClassicUserGuide.pdf?_ga=2.137234163.2108581641.1494377740-521023239.1494374769/; Copyright2011.* https://www.youtube.com/watch?v=BM_pxVyHqQ4; McPaw; Jan. 20, 2012.*

* cited by examiner

METHOD AND APPARATUS FOR CLEANING FILES IN A MOBILE TERMINAL AND ASSOCIATED MOBILE TERMINAL

RELATED APPLICATION

This application claims priority to Chinese Patent Application No. 201310566431.X, entitled "METHOD AND APPARATUS FOR CLEANING FILES IN A MOBILE TERMINAL AND ASSOCIATED MOBILE TERMINAL," filed on Nov. 14, 2013, which is incorporated by reference in its entirety.

TECHNICAL FIELD

The present application relates to the technical field of mobile terminals, and more particularly to a method and apparatus for cleaning files and a mobile terminal.

BACKGROUND

Currently, the market share of Android devices (such as mobile terminals installed with an Android operating system) is very high, and applications (that is, third-party applications, briefly referred to as "APP") that can operate on an Android system are extremely rich. When many APPs are installed and operating on an Android device, a variety of images, audio, video and other resources are stored on the Android device to serve as cache files to increase its loading speed. However, if the caches are not regularly cleaned, they eventually occupy a great amount of storage space.

In the prior art, in order to clean the cache files to release unnecessarily occupied storage space, a cleaning measure usually taken is calling an interface provided by an Android system to perform, identify and find system caches in the Android system, for example, call a preset cleaning function to achieve cleaning of cache files.

However, the foregoing cleaning measure can only identify and clean system caches. With the development of technologies, more and more APPs not only save cache files under a system directory, but also save cache files in a memory card (for example, Secure Digital Memory Card, briefly referred to as SD card); therefore, the existing cleaning measure has a problem of failing to thoroughly cleaning cache files, leading to lower utilization of storage space.

SUMMARY

The above deficiencies and other problems (e.g., security issues) associated with the conventional approach of cleaning up cache files are reduced or eliminated by the present application disclosed below. In some embodiments, the present application is implemented in a mobile terminal (e.g., a smartphone) that has a display, one or more processors, memory and one or more modules, programs or sets of instructions stored in the memory for performing multiple functions. Instructions for performing these functions may be included in a computer program product stored in a non-transitory computer readable storage medium and configured for execution by one or more processors.

One aspect of the present application involves a method for cleaning files stored in a mobile terminal is performed at the mobile terminal having one or more processors, memory and a display. The mobile terminal receives a file cleaning instruction from a user. In response to the file cleaning instruction, the mobile terminal identifies cache files based on the cache files' associated information and past user activities on the cache files and groups the identified cache files and their associated information into multiple cache file categories. Next, the mobile terminal displays information of the multiple cache file categories on the display, each cache file category having an associated file cleaning option. Finally, the mobile terminal cleans at least one of the multiple cache file categories from the mobile terminal in accordance with a user choice of the corresponding file cleaning option.

Another aspect of the present application involves a mobile terminal including a display, one or more processors, memory, and one or more program modules stored in the memory and to be executed by the one or more processors. The program modules further include instructions for: receiving a file cleaning instruction from a user; in response to the file cleaning instruction: identifying cache files based on the cache files' associated information and past user activities on the cache files; grouping the identified cache files and their associated information into multiple cache file categories; displaying information of the multiple cache file categories on the display, each cache file category having an associated file cleaning option; and cleaning at least one of the multiple cache file categories from the mobile terminal in accordance with a user choice of the corresponding file cleaning option.

Another aspect of the present application involves a non-transitory computer readable storage medium stores one or more program modules in connection with a mobile device having a display, one or more processors, the program modules including instructions for execution by one or more processors. The instructions, when executed by the one or more processors, cause the mobile device to perform the following operations: receiving a file cleaning instruction from a user; in response to the file cleaning instruction: identifying cache files based on the cache files' associated information and past user activities on the cache files; grouping the identified cache files and their associated information into multiple cache file categories; displaying information of the multiple cache file categories on the display, each cache file category having an associated file cleaning option; and cleaning at least one of the multiple cache file categories from the mobile terminal in accordance with a user choice of the corresponding file cleaning option.

Various advantages of the present application are apparent in light of the descriptions below.

BRIEF DESCRIPTION OF THE DRAWINGS

The aforementioned features and advantages of the present application as well as additional features and advantages thereof will be more cleanly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

A method and apparatus for cleaning files and a mobile terminal according to some embodiments of the present application are described below with reference to the accompanying drawings.

An embodiment of the present application provides a method for cleaning files, which may be performed by a mobile terminal, and also may be performed by a client apparatus installed in the mobile terminal, for example, an APP client apparatus having a file cleaning function. The method includes: receiving a file cleaning instruction from a user; according to the file cleaning instruction, scanning files stored in a memory card provided in a mobile terminal to extract characteristic information of the files; according to the extracted characteristic information, determining cache files in the file system; and cleaning the determined cache files.

The method for cleaning files in this embodiment of the present application can find and clean cache files stored in a memory card of a mobile terminal (such as cache files stored in an SD card installed on a mobile terminal), and can be combined with the cleaning measure in the prior art described in the foregoing section, that is, the cache files stored in the memory card can be cleaned while the system caches are cleaned, and therefore the caches are cleaned more thoroughly. Moreover, it can effectively avoid that some unnecessary cache files continuously occupy the storage space of the memory card, so as to enhance utilization of the storage space of the memory card, thereby enhancing system operating performance of the mobile terminal.

Figure 1:
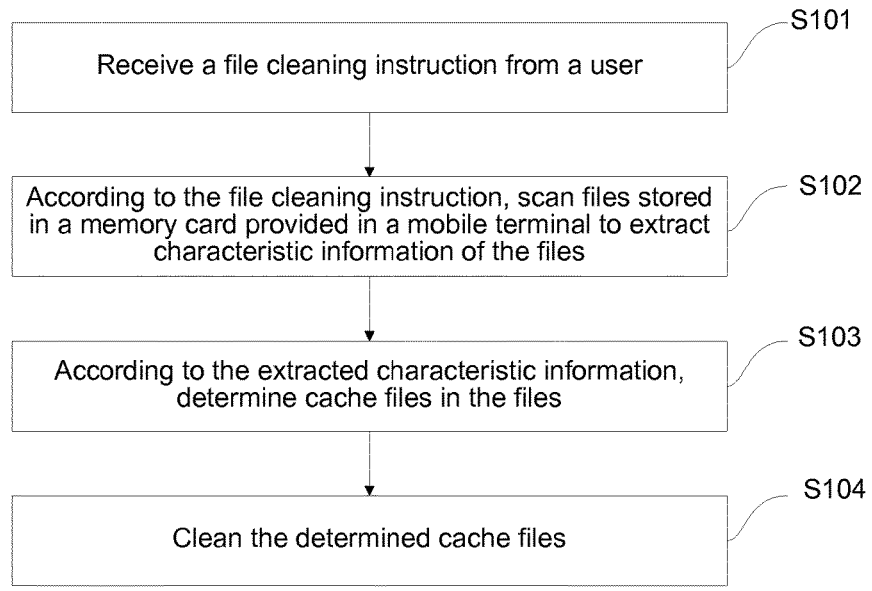
FIG. 1 is a flow chart of a method for cleaning files according to some embodiments of the present application.

FIG. 1 is a flow chart of a method for cleaning files according to some embodiments of the present application. It should be noted that, the method may be performed by a mobile terminal, and also may be performed by an APP client apparatus installed on the mobile terminal, which is not limited in the present application.

As shown in FIG. 1, the method for cleaning files according to some embodiments of the present application includes:

S101: Receive a file cleaning instruction from a user.

For example, press a corresponding file cleaning button.

S102: According to the file cleaning instruction, scan files stored in a memory card provided in a mobile terminal to extract characteristic information of the files.

For example, the extracted characteristic information includes, but is not limited to, installation file names of APPs and/or storage paths of the files. That is, the extracted characteristic information includes installation file names of APPs, and also may include storage paths of the files, and certainly, it may include both installation file names of APPs and storage paths of the files.

The memory card is installed in the mobile terminal, and the memory card, for example, is a Secure Digital Memory card, that is, an SD card. The mobile terminal includes, but is not limited to, smart phones or tablet PCs or the like.

S103: According to the extracted characteristic information, determine cache files in the file system.

The cache files in the memory card refer to cache files stored in the memory card, for example, cache files in the SD card.

Specifically, the cache files in the file system can be determined through matching of the characteristic information. In one embodiment of the present application, a cache file database can be preset in a mobile terminal, and file information specific to cache files that can be stored in the memory card is stored in the database. In this step, cache files in the memory card can be determined through matching between the extracted characteristic information and the file information in the cache file database.

Specifically, in this step, the step of determining cache files according to the extracted characteristic information includes:

1. According to the extracted characteristic information, querying a cache file database preset in the mobile terminal, the cache file database being provided with file information corresponding to cache files that can be stored in the memory card; and 2. When file information matching the extracted characteristic information is found from the cache file database, determining cache files in the file system according to the matching file information.

As a specific example, the file information may include installation file names of APPs associated with the cache files that can be stored in the memory card belong to and storage paths of the cache files that can be stored in the memory card, where the installation file names are associated with the storage paths. The expression "associated with" means that the installation file names and the storage paths have a correspondence relationship, and based on installation file names stored in the cache file database, storage paths associated with the installation file names can be queried in the cache file database, and conversely, based on storage paths of storage in the cache file database, installation file names associated with the storage paths can be queried in the cache file database. In terms of an Android device, an installation file name of an APP is an Android Package (APK) name.

Specifically, when the extracted characteristic information is installation file names of APPs, in this step, the cache file database can be queried according to the extracted installation file names, and when installation file names identical to the extracted installation file names are queried from the cache file database, storage paths associated with the installation file names identical to the extracted installation file names are further queried, and cache files in the file system are determined according to the storage paths associated with the installation file names identical to the extracted installation file names, that is, files corresponding to the storage paths (that is, storage paths of the files are the storage paths) are determined as cache files according to the storage paths associated with the installation file names identical to the extracted installation file names.

When the extracted characteristic information is storage paths of the files, in this step, optionally, the cache file database can be queried according to the extracted storage paths, and when storage paths identical to the extracted storage paths are queried from the cache file database, cache files in the file system are determined according to the storage paths identical to the extracted storage paths, that is, files in the memory card corresponding to the storage paths identical to the extracted storage paths are determined as cache files.

Optionally, in order to further improve thoroughness of cleaning of the cache files, in this step, the cache file database also can be queried according to the extracted storage paths, and when storage paths identical to the extracted storage paths are queried from the cache file database, installation file names associated with the storage paths identical to the extracted storage paths are further queried, storage paths associated with the associated installation file names are further queried according to the associated installation file names, and cache files in the file system are determined according to the storage paths associated with the associated installation file names.

In this way, according to the extracted storage paths, storage paths identical thereto are first queried in the cache file database, installation file names associated with the storage paths identical thereto are further queried in the cache file database, and then cache files in the memory card are determined through storage paths associated with the installation file names in the cache file database. As all or most of the storage paths associated with the installation file names can be stored in the cache file database, even if the extracted storage paths are incomplete, the cache files can be determined more thoroughly, so as to effectively avoid missing the cache files, thereby cleaning the cache files more thoroughly.

S104: Clean the determined cache files.

In this embodiment of the present application, many methods for deleting cache files are provided, for example, automatically cleaning cache files, or, cleaning cache files according to an instruction of a user. In this example, automatically cleaning cache files may mean automatically cleaning cache files after identifying the cache files in the memory card, which can reduce operation behaviors of the user and become user-friendly. In terms of cleaning cache files according to an instruction of a user, the user can delete some cache files selectively, so that, for the user, it can effectively avoid cleaning more valuable cache files.

According to the method for cleaning files in this embodiment of the present application, cache files in a memory card (such as cache files stored in an SD card installed on a mobile terminal) can be identified and found, and are cleaned, which can effectively avoid that the cache files continuously occupy storage space of the memory card, so as to enhance utilization of the storage space of the memory card, thereby enhancing system operating performance of the mobile terminal. Moreover, evidently, the method for cleaning files provided in this embodiment of the present application can, while cleaning system caches, clean cache files stored in a memory card, so as to clean the cache files more thoroughly.

Optionally, in one embodiment of the present application:

The file information stored in the cache file database also may include function names corresponding to cache files that can be stored in the memory card in the APPs thereof, where the function names are associated with storage paths of the cache files that can be stored in the memory card. The meaning of "associated with" is similar to the foregoing, which is not repeated herein.

It should be noted that, the function names refer to names of functions of cache files generated when APPs which the cache files belong to operate, and by taking WeChat as an example (an APP produced by Tencent), the function names may include shake, circle of friends, voice messages, user avatars, and so on.

At this time, before performing S104 to clean the determined cache files, the method for cleaning files provided in this embodiment of the present application further includes:

1. Query a cache file database, and according to file information set in the cache file database, determine function names corresponding to the cache files in the file system stored in the memory card in APPs which the cache files belong to.

Optionally, if the characteristic information extracted in S102 is installation file names of APPs which the files in the memory card belong to, function names associated with storage paths associated with installation file names identical to the extracted installation file names can be found by querying the cache file database, and then function names corresponding to cache files in the memory card in APPs which the cache files belong to are determined according to the associated function names.

Optionally, if the characteristic information extracted in S102 is storage paths of the files in the memory card, function names associated with storage paths identical to the extracted storage paths can be found by querying the cache file database, and then function names corresponding to cache files in the memory card in APPs which the cache files belong to are determined according to the associated function names.

Optionally, if the characteristic information extracted in S102 is storage paths of the files in the memory card, installation file names associated with storage paths identical to the extracted storage paths can be found by querying the cache file database, storage paths associated with the associated installation file names are further found, and function names associated with the associated storage paths are further found, so as to determine function names corresponding to cache files in the memory card in APPs which the cache files belong to according to the associated function names.

2. Display a list of cache files to clean, list items being set in the list of cache files, each list item corresponding to determined cache files, and the list items including function names corresponding to the determined cache files in APPs which the cache files belong to.

In this case, the cleaning the determined cache files in S104 includes:

according to a list item selected by a user, cleaning cache files corresponding to the list item selected by the user.

Specifically, before the determined cache files are cleaned, a list of cache files to clean can be provided for a user, and the list displays the determined cache files in a manner of list items, where the list items may include function names of the cache files, so that the user can select cache files to clean cleanly according to actual needs, which effectively enhances user experience.

The list items, in addition to including function names of the cache files, may include, but are not limited to, names of APPs which the cache files belong to, sizes of the cache files, storage paths and other information.

That is to say, in order to achieve better effects of cleaning cache files in a memory card (for example, cache files in an SD card installed in a mobile terminal), this embodiment of the present application further provides a function of classifying the cache files.

For example, based on an application, cache files corresponding thereto are classified in advance according to uses, function names are set in file information of a cache file database, and in the cache file database, each kind of cache files corresponds to installation paths and installation file names of APPs which the kind of cache files belong to, that is, it can be considered that, in the cache file database, function names of the cache files, storage paths, and installation file names of APPs associated with the cache files belong to belong to are stored in an associated manner.

For example, also taking WeChat as an example, cache files corresponding to each function of WeChat are identified in advance, such as caches of circle of friends, caches of voice messages, caches of photos, and caches of chat emoticons, so that function names of the cache files associated with APP package names (that is, installation file names of APP) of WeChat and installation paths thereof are stored in the cache file database.

In this way, in this embodiment of the present application, path names (that is, storage paths) of cache files of all uses associated with APP package names can be found in the cache file database according to the extracted characteristic information. Accordingly, information in the list items displayed to the user may include function names, storage positions (that is, path names) and size information (for example, in MBs, that is, a value of the storage space of the memory card occupied by the cache files) of the cache files. Therefore, the user can determine cache files to be deleted according to uses classified and displayed, storage space occupancy, and the like.

That is to say, the method in this embodiment of the present application can, based on each APP, classify cache files placed in a memory card according to uses, and display the cache files on a terminal interface; therefore, the user can selectively clean the cache files of the APP stored in the memory card (for example, SD card) cleanly according to actual needs.

Further, in another embodiment of the present application, the file information in the cache file database also may include delete or keep suggestions corresponding to cache files that can be stored in the memory card. The delete or keep suggestions are similar to function names, and in the cache file database, the delete or keep suggestions are associated with storage paths of the cache files, installation file names of APPs associated with the cache files belong to belong to and function names corresponding to the cache files in the APPs which the cache files belong to. The delete or keep suggestions refer to suggestion information providing reference for users; specifically, the delete suggestions indicate suggesting users' deleting the cache files, while the keep suggestions indicate suggesting users' keeping the cache files.

Therefore, before performing S104 to clean the determined cache files, the method for cleaning files according to this embodiment of the present application further includes:

1. Query a cache file database, and according to file information set in the cache file database, determine delete or keep suggestions corresponding to the cache files in the file system.

Optionally, if the extracted characteristic information in S102 is installation file names of APPs which the files in the memory card belong to, delete or keep suggestions associated with storage paths associated with installation file names identical to the extracted installation file names can be found by querying the cache file database, and then delete or keep suggestions corresponding to cache files in the memory card are further determined according to the associated delete or keep suggestions.

Optionally, if the characteristic information extracted in S102 is storage paths of the files in the memory card, delete or keep suggestions associated with storage paths identical to the extracted storage paths can be found by querying the cache file database, and then delete or keep suggestions corresponding to cache files in the memory card are further determined according to the associated delete or keep suggestions.

Optionally, if the characteristic information extracted in S102 is storage paths of the files in the memory card, installation file names associated with storage paths identical to the extracted storage paths can be found by querying the cache file database, storage paths associated with the associated installation file names are further found, delete or keep suggestions associated with the associated storage paths are further found, and then delete or keep suggestions corresponding to cache files in the memory card are further determined according to the associated delete or keep suggestions.

2. Display a list of cache files to clean, list items being set in the list of cache files, each list item corresponding to determined cache files, and the list items including function names corresponding to the determined cache files in APPs which the cache files belong to, and further including delete or keep suggestions corresponding to the determined cache files.

In this way, suggestions can be provided for users to assist the users to select cache files to clean, which effectively enhances user experience and avoids that the users delete cache files more valuable for the users.

Besides, it should be emphasized that, in some embodiments of the present application, a cache file database is used, and the cache file database is used to store file information of cache files, which is essentially a collection of information, and is a location for storing file information; therefore, specific storage forms are not limited, for example, a table form. It should be understood that, a cache file database in any storage form is applicable to the embodiments of the present application as long as it can store file information.

In the foregoing some embodiments, the methods for cleaning files provided in the present application use a cache file database, that is, before the cache files in the memory card are cleaned, it is necessary to preset a cache file database in the mobile terminal, and in the process of using the cache file database, the cache file database also can be further set (for example, updated).

The process of setting a cache file database is exemplarily introduced below, and it should be understood that, the following setting process is only exemplary, and the present application is not limited thereto.

In the exemplary embodiment, file information of cache files that can be stored in the memory card is set in the cache file database, and the file information at least includes installation file names, storage paths and function names of the cache files, where the installation file names, the storage paths and the function names are associated with each other.

Specifically, the process of setting a cache file database includes, that is, the methods for cleaning files in the embodiments on the basis of the embodiments of using the cache file database also may include:

1. Monitor the mobile terminal, and after it is monitored that the mobile terminal is installed with a new APP, run the installed APP, that is, run the newly installed APP.

Specifically, the APP can be run by calling an automated test interface.

2. Monitor files generated in the memory card when the newly installed APP is running, and determine function names of the files generated in the memory card in the installed APP.

Specifically, in this step, whether the APP produces (that is, generates) files in the memory card when the installed APP operates in an interface where the APP is opened can be monitored. When it is monitored that the APP generates files in the memory card when the APP operates in an interface where the APP is opened, identification information of the interface is read. The interface corresponds to a function of the APP, and when the APP runs a function, the APP is definitely in the interface of the function. For example, by taking WeChat as an example, when the function of "shake" is selected, an interface corresponding to "shake" is entered, and the identification information is used to identify what interface the interface is. Therefore, the function corresponding to the interface can be known according to the identification information. Specifically, the identification information may be the name of the interface, and also may be definition information of the interface. When designing various application interfaces, developers may give a definition to each interface, and the definition is definition information. For example, for a homepage interface of an APP, the name is homepage, and the definition information is usually home. Further taking WeChat as an example, the name of the interface corresponding to "shake" may be "shake interface". Then, function names corresponding to the files generated in the memory card in the installed APP are determined according to the identification information of the interface.

3. Determine whether the files generated in the memory card are cache files.

Specifically, if the files generated in the memory card meet at least one of the following conditions, it can be determined that the files are cache files:

Condition a: Names of the files generated in the memory card are identical to those of preset cache files.

Generally, developers may name particular cache files in a fixed manner when developing APPs, for example, generally, for developers, when an APP is developed, names of cache files thereof usually include: CACHE, TEMP, and so on. Therefore, it can be determined whether the files are cache files according to names of the files.

Specifically, names of the cache files that are fixedly named can be preset in a mobile terminal, and then the names of the files generated in the memory card and the names of the cache files preset are compared; when they are the same, it can be determined that the files generated are cache files.

Condition b: Types of the files generated in the memory card are preset types of the cache files.

Generally, the types of the cache files are text, image, video, audio, and so on; therefore, if the files generated in the memory card are these types, it can be determined that the files are cache files.

Condition c: When the installed APP is run, the number of times that the files generated in the memory card are used by the APP within a prescribed time exceeds a preset threshold.

Generally, a use frequency of a file, that is, the number of times that the file is used by the APP within a prescribed time, is high. Therefore, a threshold, for example, 5 or 8, can be preset, and the prescribed time may be 1 hour to 24 hours, which depends on specific cases. Besides, if the method for cleaning files according to this embodiment of the present application is performed by a client apparatus installed on a mobile terminal, the prescribed time may be an activation period of time of the client apparatus, that is, the period of time from an enabled state to an off state of the client apparatus. For example, a user turns on the client apparatus at 7:00 in the morning, and turns off the mobile terminal at 22:00 at night, and the client is always turned on, that is, in an activated state in the period of time from 7:00 to 22:00, so that this period of time can be regarded as the prescribed time. If, within this period of time, the number of times that the file is used by the APP which the file belongs to exceeds the preset threshold, it can be considered that the file is a cache file. That is to say, if the number of times that the file generated in the memory card is used by the APP within the prescribed time exceeds the threshold, it can prove that the file is a cache file.

It should be understood that, in order to improve accuracy of determining whether the generated files are cache files, at least two of the above conditions can be used for determination. That is, in order to improve accuracy of determining whether the files are cache files, the files meeting at least two of the conditions a, b and c can be determined as cache files. Therefore, occurrence of errors is effectively avoided, and normal operation of the APP is ensured.

4. If it is determined that the files are cache files, file information of the files generated in the memory card is written into the cache file database, the file information including installation file names of the installed APP, storage paths of the files generated in the memory card and function names corresponding to the files generated in the memory card in the installed APP, where the installation file names, the storage paths and the function names are associated with each other.

As an improvement to the exemplary embodiment, in another embodiment of the present application, the file information in the cache file database further includes delete/keep suggestions corresponding to the cache files. In this embodiment, all the steps in the previous embodiment are included, and after determination in step 3 ends, if it is determined that the files are cache files, the delete/keep suggestions corresponding to the cache files are further determined.

Specifically, in the method of this embodiment, the delete/keep suggestions corresponding to the cache files can be determined in the following manners:

Delete the files after it is determined that the files are cache files.

Next, a behavior of the APP corresponding to the files (that is, the installed APP) is monitored to determine whether the memory card has files identical to the deleted files when the installed APP operates.

If yes, it proves that the deleted files are files needing to be repeatedly downloaded by the APP, for example, the files may be user avatars, and therefore the files should be kept, and keep suggestions can be added to file information corresponding to the deleted files in the cache file database. The keep suggestions are associated with installation file names, storage paths and function names in the file information corresponding to the deleted files, and the association thereof is similar to the above association, which is not repeated herein.

That is to say, the files in the memory card are deleted, and it is then determined whether the memory card has files identical to the deleted files in the subsequent process of running the APP. If yes, it indicates that the files may be more valuable or may be cache files frequently used by the APP; therefore, keep suggestions can be added to file information corresponding to the cache files in the cache file database, so that instructive suggestions may be given to a user when the user processes the cache files. For example, if the cache files are deleted, the cache files need to be downloaded each time the APP is run; therefore, in order to avoid the above case, the user can keep the cache files when seeing the keep suggestions, which avoids repeated downloading of the cache files and improves execution efficiency of the APP.

Further, if the APP operates after the files generated in the memory card are deleted, and the memory card does not have files identical to the deleted files, in other words, if the memory card does not have files identical to the deleted files when the installed APP operates, the method in this embodiment also may determine keep suggestions and delete suggestions in the following manners.

If the memory card does not have files identical to the deleted files when the installed APP operates, monitor a behavior that the installed APP reads the deleted files, that is, monitor a behavior that the APP reads a file where the deleted files are. When a return result of the reading behavior is null, it indicates that running of the APP needs to read the deleted files, the files are valuable and may be repeatedly read; therefore, it can be determined that the deleted files are files suggested for keeping, and keep suggestions are added to file information corresponding to the deleted files in the cache file database, and the keep suggestions are associated with installation file names, storage paths and function names in the file information corresponding to the deleted files.

Conversely, when the return result of the reading behavior is non-null, it indicates that the APP does not read the deleted files; therefore, the deleted files are less valuable, and it can be determined that the deleted files are files suggested for deleting, delete suggestions are added to file information corresponding to the deleted files in the cache file database, and the delete suggestions are associated with installation file names, storage paths and function names in the file information corresponding to the deleted files.

In this way, the user can perform selective deletion according to the above suggestions when deleting the cache files, so as to effectively prevent valuable cache files from being cleaned and also avoid a waste of storage resources caused by missing deletion of less valuable cache files.

It should be understood that, in an actual implementation, delete suggestions and keep suggestions are relative concepts; therefore, one cache file is a file suggested for keeping or a file suggested for deleting, the delete suggestions and the keep suggestions are alternate. In one embodiment of the present application, in terms of a cache file, if it is determined that the cache file is a file suggested for keeping, a keep suggestion can be added to file information, and if it is determined that the cache file is a file suggested for deleting, a delete suggestion may be not added to the file information. That is, in the display of list items of cache files, for one cache file, if a keep suggestion is read, the keep suggestion can be displayed, and if the keep suggestion is not read, a delete suggestion can be displayed or not displayed. Likewise, if it is determined that the cache file is a file suggested for keeping, a keep suggestion may be not added, and if it is determined that the cache file is a file suggested for deleting, a delete suggestion is added to the file information. That is, in the display of list items of cache files, for one cache file, if a delete suggestion is read, the delete suggestion may either be displayed or not displayed, and if the delete suggestion is not read, a keep suggestion is displayed.

It should be noted that, cleaning of the cache files in the memory card described above includes, based on finding file information matching the characteristic information of the files in the memory card from the cache file database, determining cache files stored in the memory card according to the file information and then cleaning the cache files. However, sometimes, the following case may occur that file information matching the characteristic information of the files in the memory card cannot be found in the cache file database, and the files may still be cache files.

Therefore, based on such a case, in order to perform more accurate searches and cleaning that avoid missing cache files, in one embodiment of the present application, subsequent determination can be performed on files for which matching file information cannot be found to find out whether the files are cache files, and if yes, file information of the files is added to the cache file database. In this way, in the following file cleaning process, as new content is updated in the cache file database, more accurate searches and cleaning that avoid missing cache files can be performed.

Specifically, on the basis of the above embodiment, the method in this embodiment further includes:

1. When file information matching the characteristic information is not found in the cache file database, determine APPs associated with the characteristic information according to the characteristic information.

For example, the extracted characteristic information is installation file names of APPs and storage paths of the files, and the file information in the database includes installation file names of APPs associated with the cache files that can be stored in the memory card belong to and storage paths of the cache files that can be stored in the memory card. In this case, if installation file names identical to the extracted installation file names of APPs are not found from the cache file database, and storage paths identical to the extracted storage paths of the files are not found, APPs associated with the characteristic information are determined according to the characteristic information.

Specifically, a local search of the mobile terminal can be performed according to the extracted storage paths to find installation file names similar to the storage paths, that is, APPs associated with the installation paths are determined. Persons skilled in the art can understand that, the extracted path names include names of the files, the names of the files also can be obtained according to the storage paths, and then installation file names similar to the names are found according to the names of the files, that is, APPs associated with the installation paths are determined.

For example, according to the extracted installation paths, it is determined that names of two files are BaiduMap and BaiduMapSdk. After a local search of the mobile terminal, it is found that the name of the installation package of the APP Baidu Map installed on the mobile terminal is com.baidu.BaiduMap, the name of the file is similar to the name of the installation package; therefore, the two are associated. That is, it is determined that the APP associated with the two files is Baidu Map. If an extracted storage path of one file is . . . /sina/weibo . . . , after a local search of the mobile terminal, it is found that the name of the installation package of Sina Weibo installed on the mobile terminal is com.sina.weibo, and the two are similar; therefore, the two are associated, that is, it is determined that the APP associated with the file is Sina Weibo.

Evidently, an APP associated with a name of an installation path can be directly determined according to the name of the extracted installation path.

2. Acquire, when the APP associated with the characteristic information operates, the number of times that the APP uses files in the memory card corresponding to the characteristic information within a prescribed time.

The prescribed time may be 1 hour to 24 hours, which depends on specific cases.

3. According to the acquired number of times, determine whether the files in the memory card corresponding to the characteristic information are cache files.

Specifically, when the acquired number of times exceeds a preset threshold, it is determined that the files in the memory card corresponding to the characteristic information are cache files. The preset threshold is, for example, 5 to 8 times. In this way, if the number of times that a file is used reaches 5 to 8 times within the prescribed time, it is considered that the file is a cache file.

4. When it is determined that the files in the memory card corresponding to the characteristic information are cache files, write file information of the files corresponding to the characteristic information into the cache file database.

That is, the cache file database is updated, so that the file information included in the cache file database is more comprehensive, so as to avoid missing in a subsequent search of the cache files.

It should be understood that, if file information matching the characteristic information is not found from the cache file database, the cache file database may not record file information of the files generated in the memory card by the APP associated with the characteristic information. Therefore, when the APP is monitored, the number of times that the APP uses the files in the memory card corresponding to the characteristic information is not only monitored, the files generated in the memory card when the APP operates can be monitored, and it is determined whether the files are cache files. If the determination result is yes, the file information of the files is written into the cache file database, so that data of the cache file database is more complete and comprehensive.

Further, when the file information matching the characteristic information is not found from the cache file database, in order to further accurately determine whether the files are cache files, that is, after step 1, it can be further determined whether types of the files in the memory card corresponding to the characteristic information are types of the cache files.

Similar to the above embodiment, generally, for example, the possibility is high that files of types such as image, video and audio are cache files.

Therefore, in step 3, for determination on the cache files, the determining whether the files in the memory card corresponding to the characteristic information are cache files according to the acquired number of times specifically is:

when the acquired number of times exceeds a preset threshold, and types of the files in the memory card corresponding to the characteristic information are types of the cache files, determining that the files in the memory card corresponding to the characteristic information are cache files.

For example, if the number of times that a file is used reaches 5 to 8 times within a prescribed time, and the file type of the file is the type such as image, audio or video, it is considered that the file is a cache file, thereby improving accuracy of determining cache files, avoiding incorrect determination or missing determination, so that in subsequent cleaning, effective utilization of storage resource is ensured, and normal execution of the APP or execution efficiency of the APP is also ensured.

It should be noted that, the method according to this embodiment of the present application not only can clean the cache files stored in the memory card, but also can clean cache files in the system of the mobile terminal. As a specific example, in the method provided in one embodiment of the present application, the existing function of cleaning cache files in the system can be inherited.

Specifically, the method is performed by an APP client apparatus installed in a mobile terminal, for example, an APP client apparatus having a file cleaning function.

Figure 2:
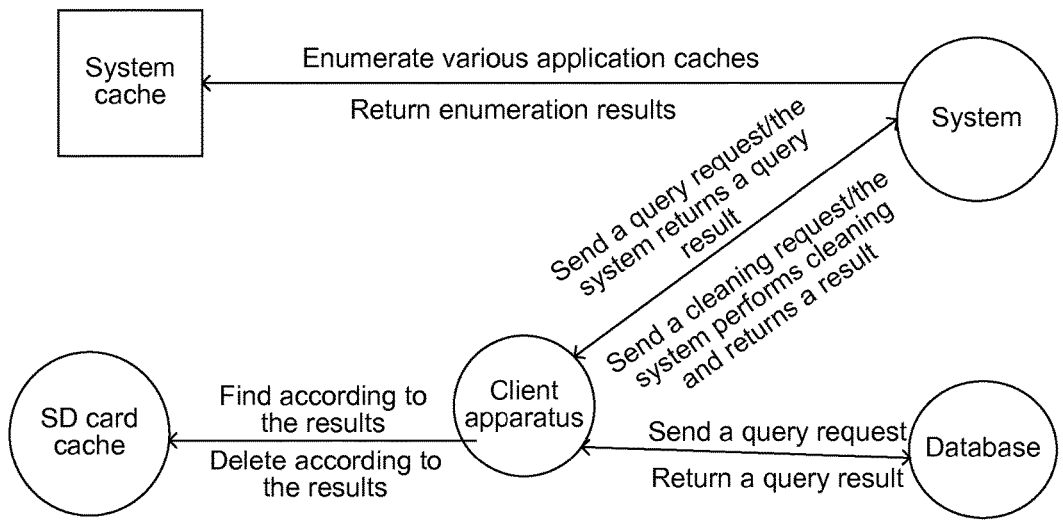
FIG. 2 is a principle view of a cleaning process of a method for cleaning files according to some embodiments of the present application.

As shown in FIG. 2, the method is performed by an APP client apparatus having a file cleaning function, and that the client apparatus is installed in a mobile terminal of an Android system is taken as an example. During file cleaning, based on system cache files, the client apparatus applies for a system cache cleaning right, specifically, applies for an android.permission.CLEAR_APP_CACHE right, and calls functions for cleaning system cache files in the android system, for example, a freeStorageAndNotify( ) method to request to query system caches, and then the system feeds back enumeration results for the system caches, which may include APPs having the system caches and sizes of the system caches corresponding thereto. Next, the client apparatus initiates a cleaning application according to user demands, and the system, upon reception, cleans the system caches of all APPs, and feeds back results.

For cache files on a memory card (for example, an SD card), the client apparatus extracts characteristic information of files in the memory card, and initiates a query application to a cache file database in the mobile terminal to obtain APPs corresponding to the cache files and cache storage positions thereof. According to the information obtained through query, the client apparatus may search for and delete the cache files for the SD card. Therefore, the method in this embodiment can clean system cache files and cache files in the memory card, so as to clean more cache files.

Figure 3:
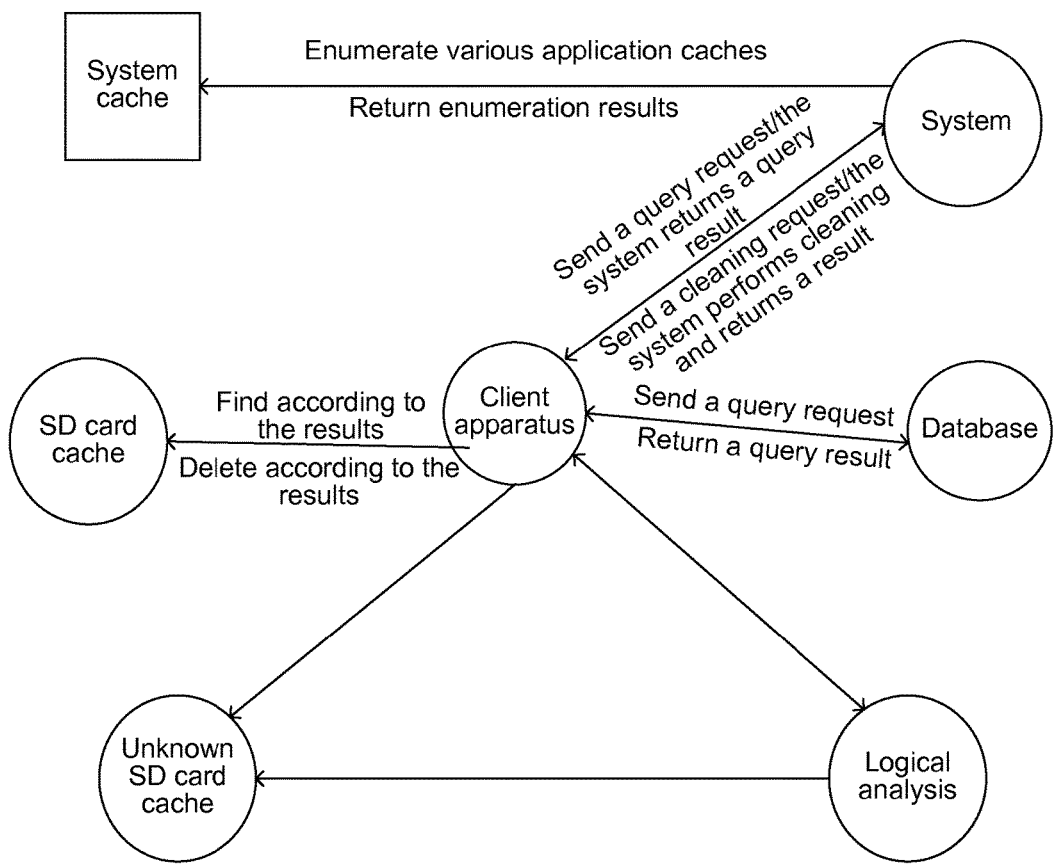
FIG. 3 is a principle view of a cleaning process of a method for cleaning files according to another embodiment of the present application.

On the basis of the embodiment shown in FIG. 2, as shown in FIG. 3, in another embodiment of the present application, the client apparatus intelligently identifies cache files in the memory card not specified in file information in more databases through logical analysis. In combination with the illustration of FIG. 3, functions of analyzing APPs' own behaviors and analyzing file types (that is, logical analysis) are newly added to the client apparatus. The part of analyzing APPs' own behaviors may monitor an event that APPs create files on the memory card, and the frequency that the APPs use the created files, and can further analyze file types to find files conforming to cache file standards. Through such analysis, cache files existing in the memory card generated by various kinds of new APPs can be effectively found and identified, and the database can be updated according to information of the cache files.

In specific applications, the case may exist that file information does not have file information matching the characteristic information; therefore, when file information matching the characteristic information is not found, the logical analysis function in FIG. 3 can perform the cleaning operation in the following manners:

1. After all the files on the memory card have been scanned, establish an association relationship according to similarity of the characteristic information of the files based on the case that file information matching the characteristic information is not found.

For example, when it is scanned that there is similarity between storage paths or file names and installation package names of APPs locally installed on a mobile terminal, an association relationship is established therebetween. For example:

An installation file name of the APP of Baidu Map is com.baidu.BaiduMap. If files such as BaiduMap and BaiduMapSdk are scanned, it is considered that there is similarity therebetween, and then the installation file name of the APP and storage paths of the two files are associated.

An installation file name of the APP of Sina Weibo is com.sina.weibo. If a file such as /sina/weibo is scanned, it indicates that there is similarity between the file and the installation file name of the APP, files under the folder, such as /sina/weibo/.portrait and /sina/weibo/pre files, are further scanned, and an association relationship is established between storage paths of the two files and the installation file name of the APP of Sina Weibo.

2. With respect to the established association relationship, monitor an APP's behavior in real time in the association relationship to acquire generated files.

Specifically, in the monitoring process, the frequency that the APP uses each file is simultaneously monitored, and when the use frequency of a certain file exceeds a preset threshold, it is determined that the file is a cache file of the APP, and then an association relationship between the file and the installation file name of the APP is kept in the cache file database. If it does not exceed the preset threshold, it indicates that the file is a necessary data file of the APP, and cannot be deleted, and then the association relationship between the part of file and the installation file name of the APP is further deleted. Preferably, the preset threshold may be set as 5 or 8.

For example, in terms of Baidu Map and Sina Weibo listed above, two files associated with Baidu Map can be determined in the above manner as non-cache files, and two files associated with Sina Weibo can be determined as cache files.

According to the method for cleaning files in this embodiment of the present application, cache files in a memory card (such as cache files stored in an SD card installed on a mobile terminal) can be identified and found, and are cleaned, which can effectively avoid that the cache files continuously occupy storage space of the memory card, so as to enhance utilization of the storage space of the memory card, thereby enhancing system operating performance of the mobile terminal. Moreover, the method for cleaning files provided in this embodiment of the present application can, while cleaning the system caches, clean cache files stored in a memory card, so as to enable cleaning of the cache files to be more thorough. Besides, the method in this embodiment of the present application can, based on each APP, classify cache files placed in a memory card according to uses, and further display the cache files on a terminal interface. Therefore, the user can complete cleaning of caches of the SD card of the APP cleanly according to actual needs.

Figure 4:
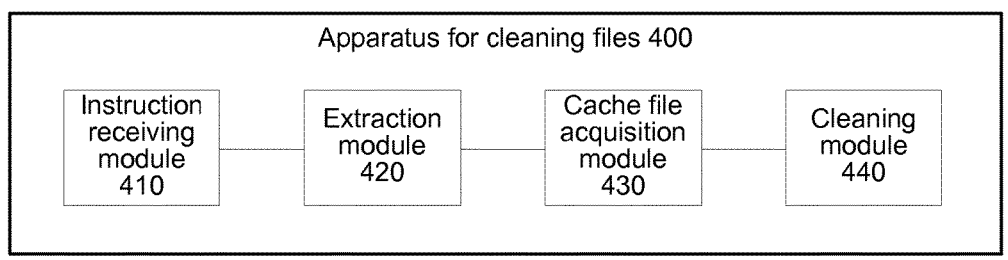
FIG. 4 is a structural view of an apparatus for cleaning files according to some embodiments of the present application.

A further embodiment of the present application provides an apparatus for cleaning files. As shown in FIG. 4, the apparatus 400 for cleaning files according to some embodiments of the present application includes: an instruction receiving module 410, an extraction module 420, a cache file acquisition module 430 and a cleaning module 440.

The instruction receiving module 410 is used for receiving a file cleaning instruction from a user. The extraction module 420 is used for, according to the file cleaning instruction, scanning files stored in a memory card provided in a mobile terminal to extract characteristic information of the files. The cache file acquisition module 430 is used for, according to the extracted characteristic information, determining cache files in the file system. The cleaning module is used for cleaning the determined cache files.

The extracted characteristic information includes, but is not limited to, installation file names of APPs and/or storage paths of the files. That is, the extracted characteristic information includes installation file names of APPs, and also may include storage paths of the files, and certainly, it may include both installation file names of APPs and storage paths of the files.

The memory card is installed in the mobile terminal, and the memory card, for example, is a Secure Digital Memory card, that is, an SD card. The mobile terminal includes, but is not limited to, smart phones or tablet PCs or the like.

The cache files in the memory card refer to cache files stored in the memory card, for example, cache files in the SD card.

Specifically, the cache file acquisition module 430 is used for, according to the extracted characteristic information, querying a cache file database preset in the mobile terminal, the cache file database being provided with file information corresponding to cache files that can be stored in the memory card, and when file information matching the extracted characteristic information is found from the cache file database, determining cache files in the file system according to the matching file information.

As a specific example:

The extracted characteristic information includes: installation file names of APPs and/or storage paths of the files.

The file information may include installation file names of APPs associated with the cache files that can be stored in the memory card belong to and storage paths of the cache files that can be stored in the memory card, where the installation file names are associated with the storage paths. Please refer to the definition of association indicated in the above method for the expression "associated with" herein.

At this time, the cache file acquisition module 430 is used for:

when the extracted characteristic information is installation file names of APPs, querying the cache file database according to the extracted installation file names, and when installation file names identical to the extracted installation file names are queried from the cache file database, further querying storage paths associated with the installation file names identical to the extracted installation file names, and determining cache files in the file system according to the storage paths associated with the installation file names identical to the extracted installation file names, that is, determining files corresponding to the storage paths (that is, storage paths of the files are the storage paths) as cache files according to the storage paths associated with the installation file names identical to the extracted installation file names.

When the extracted characteristic information is storage paths of the files:

The cache file database can be queried according to the extracted storage paths, and when storage paths identical to the extracted storage paths are queried from the cache file database, cache files in the file system are determined according to the storage paths identical to the extracted storage paths, that is, files in the memory card corresponding to the storage paths identical to the extracted storage paths are determined as cache files.

In order to further improve thoroughness of cleaning of the cache files, the cache file acquisition module 430 also can query the cache file database according to the extracted storage paths, and when storage paths identical to the extracted storage paths are queried from the cache file database, further query installation file names associated with the storage paths identical to the extracted storage paths, further query storage paths associated with the associated installation file names according to the associated installation file names, and determine cache files in the file system according to the storage paths associated with the associated installation file names.

In this way, according to the extracted storage paths, storage paths identical thereto are first queried in the cache file database, installation file names associated with the storage paths identical thereto are further queried in the cache file database, and then cache files in the memory card are determined through storage paths associated with the installation file names in the cache file database. As all or most of the storage paths associated with the installation file names can be stored in the cache file database, even if the extracted storage paths are incomplete, the cache files can be determined more thoroughly, so as to effectively avoid missing the cache files, thereby cleaning the cache files more thoroughly.

In this embodiment of the present application, the cleaning module 440 provides many manners of deleting cache files, for example, automatically cleaning cache files, or, cleaning cache files according to an instruction of a user. In this example, automatically cleaning cache files may mean that the cleaning module 440 automatically cleans cache files after identifying the cache files in the memory card, which can reduce operation behaviors of the user and is user-friendly. When the cleaning module 440 cleans cache files according to an instruction of a user, the user can delete some cache files selectively, so that, for the user, it can effectively avoid cleaning more valuable cache files.

Further, in one embodiment of the present application:

The apparatus further includes a cache file list generating module (not shown).

The file information also may include function names corresponding to cache files that can be stored in the memory card in APPs which the cache files belong to, where the function names are associated with storage paths of the cache files that can be stored in the memory card.

At this time, before the cleaning module 440 cleans the determined cache files, the cache file acquisition module 430 is further used for:

when the characteristic information extracted is installation file names of APPs which the files in the memory card belong to, finding function names associated with storage paths associated with installation file names identical to the extracted installation file names by querying the cache file database, and then determining function names corresponding to cache files in the memory card in APPs which the cache files belong to according to the associated function names.

When the characteristic information extracted is storage paths of the files in the memory card:

function names associated with storage paths identical to the extracted storage paths can be found by querying the cache file database, and the function names corresponding to cache files in the memory card in APPs which the cache files belong to are determined according to the associated function names.

Also, installation file names associated with storage paths identical to the extracted storage paths can be found by querying the cache file database, storage paths associated with the associated installation file names are further found, and function names associated with the associated storage paths are further found, so as to determine function names corresponding to cache files in the memory card in APPs which the cache files belong to according to the associated function names.

The cache file list generating module is used for displaying a list of cache files to clean, list items being set in the list of cache files, each list item corresponding to determined cache files, and the list items including function names corresponding to the determined cache files in APPs which the cache files belong to.

In this case, the cleaning module 440 can, according to a list item selected by a user, clean cache files corresponding to the list item selected by the user.

Further, in another embodiment of the present application, the file information in the cache file database also may include delete or keep suggestions corresponding to cache files that can be stored in the memory card. The delete or keep suggestions are similar to function names, and in the cache file database, the delete or keep suggestions are associated with storage paths of the cache files, installation file names of APPs which the cache files belong to and function names corresponding to the cache files in the APPs which the cache files belong to. The delete or keep suggestions refer to suggestion information providing reference for users; specifically, the delete suggestions indicate suggesting users' deleting the cache files, while the keep suggestions indicate suggesting users' keeping the cache files.

Therefore, the cache file acquisition module 430 is used for:

when the extracted characteristic information is installation file names of APPs which the files in the memory card belong to, finding delete or keep suggestions associated with storage paths associated with installation file names identical to the extracted installation file names by querying the cache file database, and then determining delete or keep suggestions corresponding to cache files in the memory card according to the associated delete or keep suggestions;

when the extracted characteristic information is storage paths of the files in the memory card, finding delete or keep suggestions associated with storage paths identical to the extracted storage paths by querying the cache file database, and then determining delete or keep suggestions corresponding to cache files in the memory card according to the associated delete or keep suggestions; and when the extracted characteristic information is storage paths of the files in the memory card, finding installation file names associated with storage paths identical to the extracted storage paths by querying the cache file database, finding storage paths associated with the associated installation file names, finding delete or keep suggestions associated with the associated storage paths, and then determining delete or keep suggestions corresponding to cache files in the memory card according to the associated delete or keep suggestions.

At this time, when the cache file list generating module displays the list of cache files to clean, the list items further include delete or keep suggestions corresponding to the determined cache files.

In this way, suggestions can be provided for users to assist the users to select cache files to clean, which effectively enhances user experience and avoids that the users delete cache files more valuable for the users.

In some of the previous embodiments, the apparatuses for cleaning files provided in the present application all use a cache file database before the cache files in the memory card are cleaned, it is necessary to set a cache file database in an intelligent terminal.

In one embodiment of the present application, the apparatus for cleaning files further includes a cache file database generating module (not shown), used for:

after it is monitored that the mobile terminal is installed with a new APP, running the installed APP; monitoring files generated in the memory card when the installed APP is running, and determining function names of the files generated in the memory card in the installed APP; determining whether the files generated in the memory card are cache files; and if it is determined that the files are cache files, writing file information of the files generated in the memory card into the cache file database, the file information including installation file names of the installed APP, storage paths of the files generated in the memory card and function names corresponding to the files generated in the memory card in the installed APP, where the installation file names, the storage paths and the function names are associated with each other.

Specifically, the cache file database generating module monitors whether the installed APP generates files in the memory card when the installed APP operates in an interface where the installed APP is opened, and if it is monitored that the installed APP generates files in the memory card when the installed APP operates in an interface where the installed APP is opened, reading identification information of the interface, and according to the identification information of the interface, determining function names corresponding to the files generated in the memory card in the installed APP.

Specifically, the cache file database generating module can determine that the files are cache files when the files generated in the memory card meet at least one of the following conditions:

Condition a: Names of the files generated in the memory card are identical to those of preset cache files.

Condition b: Types of the files generated in the memory card are preset types of the cache files.

Condition c: When the installed APP is run, the number of times that the files generated in the memory card are used by the APP within a prescribed time exceeds a preset threshold.

It should be understood that, in order to improve accuracy of determining whether the files generated are cache files, at least two of the above conditions can be used for determination. That is, in order to improve accuracy of determining whether the files are cache files, the files meeting at least two of the conditions a, b and c can be determined as cache files. Therefore, occurrence of errors is effectively avoided, and normal operation of the APP is ensured.

As an improvement to the exemplary embodiment, in another embodiment of the present application, the file information in the cache file database further includes delete/keep suggestions corresponding to the cache files. In this way, the cache file database generating module is used for: after it is determined that the files are cache files, deleting the files generated in the memory card, determining whether the memory card has files identical to the deleted files when the installed APP operates, and if yes, adding keep suggestions to file information corresponding to the deleted files in the cache file database, where the keep suggestions are associated with installation file names, storage paths and function names in the file information corresponding to the deleted files, and the association thereof is similar to the above association, which is not repeated herein.

Further, if the APP operates after the files generated in the memory card are deleted, and if the memory card does not have files identical to the deleted files, the cache file database generating module is further used for:

monitoring a behavior that the installed APP reads the deleted files, when a return result of the reading behavior is null, determining that the deleted files are files suggested for keeping, and adding keep suggestions to file information corresponding to the deleted files in the cache file database, where the keep suggestions are associated with installation file names, storage paths and function names in the file information corresponding to the deleted files.

Conversely, the cache file database generating module further can be used for: when the return result of the reading behavior is non-null, determining that the deleted files are files suggested for deleting, and adding delete suggestions to file information corresponding to the deleted files in the cache file database, where the delete suggestions are associated with installation file names, storage paths and function names in the file information corresponding to the deleted files. That is, the files may be cache files not of great value, and deleting is suggested.

Further, in one embodiment of the present application, in order to perform more accurate searches and cleaning that avoid missing cache files, the apparatus further may include:

a cache file database updating module (not shown), used for:

when file information matching the characteristic information is not found in the cache file database, determining APPs associated with the characteristic information according to the characteristic information; acquiring, when the APP associated with the characteristic information operates, the number of times that the APP uses files in the memory card corresponding to the characteristic information within a prescribed time; according to the acquired number of times, determining whether the files in the memory card corresponding to the characteristic information are cache files; and when it is determined that the files in the memory card corresponding to the characteristic information are cache files, writing file information of the files corresponding to the characteristic information into the cache file database.

When the file information matching the characteristic information is not found from the cache file database, in order to further accurately determine whether the files are cache files, the cache file database updating module also can determine whether types of the files in the memory card corresponding to the characteristic information are types of the cache files; and when the acquired number of times exceeds a preset threshold, and types of the files in the memory card corresponding to the characteristic information are types of the cache files, determine that the files in the memory card corresponding to the characteristic information are cache files. This can effectively improve accuracy of determination of cache files, avoiding incorrect determination or missing determination, so that in subsequent cleaning, effective utilization of storage resource is ensured, and normal execution of the APP or execution efficiency of the APP is also ensured.

Optionally, in one embodiment of the present application, the extracted characteristic information includes installation file names of APPs and storage paths of the files. File information includes installation file names of APPs which cache files that can be stored in the memory card belong to and storage paths of the cache files that can be stored in the memory card. In this way, the cache file database updating module is used for, when installation file names identical to the extracted installation file names of APPs and storage paths identical to the extracted storage paths of the files are not found from the cache file database, determining APPs associated with the characteristic information according to the characteristic information.

In one embodiment of the present application, the apparatus in this embodiment of the present application not only can clean cache files stored in a memory card, but also can clean cache files in the system of the mobile terminal. As a specific example, the apparatus in this embodiment of the present application further can inherit the function of cleaning cache files in the system, for example, an APP client apparatus having a file cleaning function. Please refer to the client apparatus as shown in FIG. 2 and FIG. 3 for details, and refer to the description about the foregoing methods, which is not repeated herein.

According to the apparatus for cleaning files in this embodiment of the present application, cache files in a memory card (such as cache files stored in an SD card installed on a mobile terminal) can be identified and found, and are cleaned, which can effectively avoid that the cache files continuously occupy storage space of the memory card, so as to enhance utilization of the storage space of the memory card, thereby enhancing system operating performance of the mobile terminal. Moreover, the apparatus for cleaning files provided in this embodiment of the present application can, while cleaning the system caches, clean cache files stored in a memory card, so as to enable cleaning of the cache files to be more thorough. Besides, the apparatus in this embodiment of the present application can, based on each APP, classify cache files placed in a memory card according to uses, and display the cache files on a terminal interface, and therefore, the user can complete cleaning of caches of the SD card of the APP cleanly according to actual needs.

Figure 5:
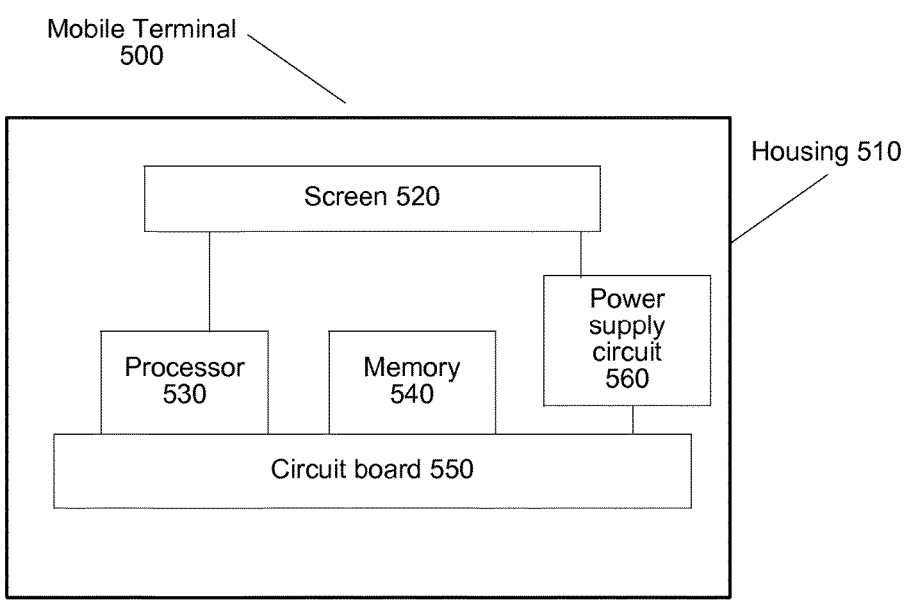
FIG. 5 is a schematic view of a mobile terminal according to some embodiments of the present application.

A further embodiment of the present application further provides a mobile terminal. As shown in FIG. 5, the mobile terminal 500 according to this embodiment of the present application includes: a housing 510, a screen 520, a processor 530, a memory 540, a circuit board 550 and a power supply circuit 560.

The screen 520 is disposed on the housing 510, the circuit board 550 is disposed inside a space encircled by the housing 510, the processor 530 and the memory 540 are disposed on the circuit board 550; the power supply circuit 560 is used for supplying power for each circuit or device of the mobile terminal 500; and the processor 530 is used for processing data, and is specifically used to:

S101: Receive a file cleaning instruction from a user. For example, press a corresponding file cleaning button.

S102: According to the file cleaning instruction, scan files stored in a memory card provided in a mobile terminal to extract characteristic information of the files.

For example, the extracted characteristic information includes, but is not limited to, installation file names of APPs and/or storage paths of the files. That is, the extracted characteristic information includes installation file names of APPs, and also may include storage paths of the files, and certainly, it may include both installation file names of APPs and storage paths of the files.

The memory card is installed in the mobile terminal, and the memory card, for example, is a Secure Digital Memory card, that is, an SD card. The mobile terminal includes, but is not limited to, smart phones or tablet PCs or the like.

S103: According to the extracted characteristic information, determine cache files in the file system.

The cache files in the memory card refer to cache files stored in the memory card, for example, cache files in the SD card.

Optionally, cache files in the file system can be determined through matching of the characteristic information. In one embodiment of the present application, a cache file database can be preset in a mobile terminal, and file information specific to cache files that can be stored in the memory card is stored in the database. In this step, cache files in the memory card can be determined through matching between the extracted characteristic information and the file information in the cache file database.

Specifically, the processor 530 is used to:

1. According to the extracted characteristic information, query a cache file database preset in the mobile terminal, the cache file database being provided with file information corresponding to cache files that can be stored in the memory card.

2. When file information matching the extracted characteristic information is found from the cache file database, determine cache files in the file system according to the matching file information.

As a specific example, the file information may include installation file names of APPs which the cache files that can be stored in the memory card belong to and storage paths of the cache files that can be stored in the memory card, where the installation file names are associated with the storage paths. The expression "associated with" means that the installation file names and the storage paths have a correspondence relationship, based on installation file names stored in the cache file database, storage paths associated with the installation file names can be queried in the cache file database, and conversely, based on storage paths of storage in the cache file database, installation file names associated with the storage paths can be queried in the cache file database. In terms of an Android device, an installation file name of an APP is an Android Package (APK) name.

Specifically, when the extracted characteristic information is installation file names of APPs, in this step, the processor 530 can query the cache file database according to the extracted installation file names, and when querying installation file names identical to the extracted installation file names from the cache file database, further query storage paths associated with the installation file names identical to the extracted installation file names, and determine cache files in the file system according to the storage paths associated with the installation file names identical to the extracted installation file names, that is, determine files corresponding to the storage paths (that is, storage paths of the files are the storage paths) as cache files according to the storage paths associated with the installation file names identical to the extracted installation file names.

When the extracted characteristic information is storage paths of the files, optionally, the processor 530 can query the cache file database according to the extracted storage paths, and when querying storage paths identical to the extracted storage paths from the cache file database, determine cache files in the file system according to the storage paths identical to the extracted storage paths, that is, determine files in the memory card corresponding to the storage paths identical to the extracted storage paths as cache files.

Optionally, in order to further improve thoroughness of cleaning of the cache files, the processor 530 also can query the cache file database according to the extracted storage paths, when querying storage paths identical to the extracted storage paths from the cache file database, further query installation file names associated with the storage paths identical to the extracted storage paths, further query storage paths associated with the associated installation file names according to the associated installation file names, and determine cache files in the file system according to the storage paths associated with the associated installation file names.

In this way, according to the extracted storage paths, storage paths identical thereto are first queried in the cache file database, installation file names associated with the storage paths identical thereto are further queried in the cache file database, and then cache files in the memory card are determined through storage paths associated with the installation file names in the cache file database. As all or most of the storage paths associated with the installation file names can be stored in the cache file database, even if the extracted storage paths are incomplete, the cache files can be determined more thoroughly, so as to effectively avoid missing the cache files, thereby cleaning the cache files more thoroughly.

S104: Clean the determined cache files.

In this embodiment of the present application, the processor 530 provides many manners of deleting cache files, for example, automatically cleaning cache files, or, cleaning cache files according to an instruction of a user. In this example, automatically cleaning cache files may mean automatically cleaning cache files after identifying the cache files in the memory card, which can reduce operation behaviors of the user and is user-friendly. In terms of cleaning cache files according to an instruction of a user, the user can delete some cache files selectively, so that, for the user, it can effectively avoid cleaning more valuable cache files.

Optionally, in one embodiment of the present application:

The file information also may include function names corresponding to cache files that can be stored in the memory card in the Apps thereof, where the function names are associated with storage paths of the cache files that can be stored in the memory card. The meaning of "associated with" is similar to the foregoing one, which is not repeated herein.

At this time, before the cleaning the determined cache files, the processor 530 is further used to:

1. Query a cache file database, and according to file information set in the cache file database, determine function names corresponding to the cache files in the file system in APPs which the cache files belong to.

Optionally, if the characteristic information extracted is installation file names of APPs which the files in the memory card belong to, function names associated with storage paths associated with installation file names identical to the extracted installation file names can be found by querying the cache file database, and then function names corresponding to cache files in the memory card in APPs which the cache files belong to are determined according to the associated function names.

Optionally, if the characteristic information extracted is storage paths of the files in the memory card, function names associated with storage paths identical to the extracted storage paths can be found by querying the cache file database, and then function names corresponding to cache files in the memory card in APPs which the cache files belong to are determined according to the associated function names.

Optionally, if the characteristic information extracted is storage paths of the files in the memory card, installation file names associated with storage paths identical to the extracted storage paths can be found by querying the cache file database, storage paths associated with the associated installation file names are further found, and function names associated with the associated storage paths are further found, so as to determine function names corresponding to cache files in the memory card in APPs which the cache files belong to according to the associated function names.

2. Display a list of cache files to clean, list items being set in the list of cache files, each list item corresponding to determined cache files, and the list items including function names corresponding to the determined cache files in APPs which the cache files belong to.

In this case, the processor 530 is used for, according to a list item selected by a user, cleaning cache files corresponding to the list item selected by the user.

Specifically, before the determined cache files are cleaned, a list of cache files to clean can be provided for a user, and the list displays the determined cache files in a manner of list items, where the list items may include function names of the cache files, so that the user can select cache files to clean cleanly according to actual needs, which effectively enhances user experience.

The list items, in addition to including function names of the cache files, may include, but are not limited to, names of APPs which the cache files belong to, sizes of the cache files, storage paths and other information.

Further, in another embodiment of the present application, the file information in the cache file database also may include delete or keep suggestions corresponding to cache files that can be stored in the memory card. The delete or keep suggestions are similar to function names, and in the cache file database, the delete or keep suggestions are associated with storage paths of the cache files, installation file names of APPs which the cache files belong to and function names corresponding to the cache files in the APPs which the cache files belong to. The delete or keep suggestions refer to suggestion information providing reference for users; specifically, the delete suggestions indicate suggesting users' deleting the cache files, while the keep suggestions indicate suggesting users' keeping the cache files.

At this time, before cleaning the determined cache files, the processor 530 is further used to:

1. Query a cache file database, and according to file information set in the cache file database, determine delete or keep suggestions corresponding to the cache files in the file system.

Optionally, if the extracted characteristic information is installation file names of APPs which the files in the memory card belong to, delete or keep suggestions associated with storage paths associated with installation file names identical to the extracted installation file names can be found by querying the cache file database, and then delete or keep suggestions corresponding to cache files in the memory card are further determined according to the associated delete or keep suggestions.

Optionally, if the extracted characteristic information is storage paths of the files in the memory card, delete or keep suggestions associated with storage paths identical to the extracted storage paths can be found by querying the cache file database, and then delete or keep suggestions corresponding to cache files in the memory card are further determined according to the associated delete or keep suggestions.

Optionally, if the extracted characteristic information is storage paths of the files in the memory card, installation file names associated with storage paths identical to the extracted storage paths can be found by querying the cache file database, storage paths associated with the associated installation file names are further found, delete or keep suggestions associated with the associated storage paths are further found, and then delete or keep suggestions corresponding to cache files in the memory card are further determined according to the associated delete or keep suggestions.

2. Display a list of cache files to clean, list items being set in the list of cache files, each list item corresponding to determined cache files, and the list items including function names corresponding to the determined cache files in APPs which the cache files belong to, and further including delete or keep suggestions corresponding to the determined cache files.

In this way, suggestions can be provided for users to assist the users to select cache files to clean, which effectively enhances user experience and avoids that the users delete cache files more valuable for the users.

Optionally, in one embodiment of the present application, file information of cache files that can be stored in the memory card is set in the cache file database, and the file information at least includes installation file names, storage paths and function names of the cache files, where the installation file names, the storage paths and the function names are associated.

Specifically, the processor 530 is further used to:

1. After it is monitored that the mobile terminal is installed with a new APP, run the installed APP, that is, run the newly installed APP.

Specifically, the APP can be run by calling an automated test interface.

2. Monitor files generated in the memory card when running the newly installed APP, and determine function names of the files generated in the memory card in the installed APP.

Specifically, whether the installed APP produces (that is, generates) files in the memory card can be monitored when the installed APP operates in an interface where the installed APP is opened. If it is monitored that the installed APP generates files in the memory card when the installed APP operates in an interface where the installed APP is opened, identification information of the interface is read. The interface corresponds to a function of the APP, and when the APP runs a function, the APP is definitely in the interface of the function. For example, by taking WeChat as an example, when the function of "shake" is selected, an interface corresponding to "shake" is entered and the identification information is used to identify what interface the interface is. Therefore, the function corresponding to the interface can be known according to the identification information. Specifically, the identification information may be the name of the interface, and also may be definition information of the interface. When designing various application interfaces, developers may give a definition to each interface, and the definition is definition information. For example, for a homepage interface of an APP, the name is homepage, and the definition information is usually home. Further taking WeChat as an example, the name of the interface corresponding to "shake" may be "shake interface". Then, function names corresponding to the files generated in the memory card in the installed APP are determined according to the identification information of the interface.

3. Determine whether the files generated in the memory card are cache files.

Specifically, if the files generated in the memory card meet at least one of the following conditions, it can be determined that the files are cache files:

Condition a: Names of the files generated in the memory card are identical to those of preset cache files.

Condition b: Types of the files generated in the memory card are preset types of the cache files.

Condition c: When the installed APP is run, the number of times that the files generated in the memory card are used by the APP within a prescribed time exceeds a preset threshold.

It should be understood that, in order to improve accuracy of determining whether the files generated are cache files, at least two of the above conditions can be used for determination. That is, in order to improve accuracy of determining whether the files are cache files, the files meeting at least two of the conditions a, b and c can be determined as cache files. Therefore, occurrence of errors is effectively avoided, and normal operation of the APP is ensured.

4. If it is determined that the files are cache files, file information of the files generated in the memory card is written into the cache file database, the file information including an installation file name of the installed APP, storage paths of the files generated in the memory card and function names corresponding to the files generated in the memory card in the installed APP, where the installation file name, the storage paths and the function names are associated with each other.

As an improvement to the exemplary embodiment, in another embodiment of the present application, the file information in the cache file database further includes delete/keep suggestions corresponding to the cache files.

Specifically, the delete/keep suggestions corresponding to the cache files included in the file information of the cache file database may be determined in the following manners, that is, in the mobile terminal according to this embodiment of the present application, the processor 530, after determining that the files are cache files, is further used for: deleting the files generated in the memory card, determining whether the memory card has files identical to the deleted files when the installed APP operates, and if yes, adding keep suggestions to file information corresponding to the deleted files in the cache file database, where the keep suggestions are associated with installation file names, storage paths and function names in the file information corresponding to the deleted files, and the association thereof is similar to the above association, which is not repeated herein.

That is to say, the files in the memory card are deleted, whether the memory card has files identical to the deleted files is determined then in the subsequent process of running the APP, and if yes, it indicates that the files may be more valuable or cache files frequently used by the APP; therefore, keep suggestions can be added to file information corresponding to the cache files in the cache file database, so that instructive suggestions may be given to a user when the user processes the cache files. For example, if the cache files are deleted, the cache files need to be downloaded each time the APP is run; therefore, in order to avoid the above case, the user can keep the cache files when seeing the keep suggestions, which avoids repeated downloading of the cache files and improves execution efficiency of the APP.

Further, if the APP operates after the files generated in the memory card are deleted, and if the memory card does not have files identical to the deleted files, in other words, the processor 530 is further used for:

if the memory card does not have files identical to the deleted files when the installed APP operates, monitoring a behavior that the installed APP reads the deleted files, when a return result of the reading behavior is null, determining that the deleted files are files suggested for keeping, and adding keep suggestions to file information corresponding to the deleted files in the cache file database, where the keep suggestions are associated with installation file names, storage paths and function names in the file information corresponding to the deleted files.

That is to say, if the APP, when reading the deleted files, does not read the files, it is considered that the files are cache files that should be kept, and keep suggestions are added to file information corresponding to the deleted files in the cache file database.

Conversely, when the return result of the reading behavior is non-null, it is determined that the deleted files are files suggested for deleting, delete suggestions are added to file information corresponding to the deleted files in the cache file database, and the delete suggestions are associated with installation file names, storage paths and function names in the file information corresponding to the deleted files. That is, the files may be cache files not of great value, and deleting is suggested.

In this way, the user can perform selective deletion according to the above suggestions when deleting the cache files, so as to effectively prevent valuable cache files from being cleaned, which also can avoid wasting storage resources caused by missing deletion of less valuable cache files.

Cleaning of the cache files in the memory card described above includes, based on finding file information matching the characteristic information of the files in the memory card from the cache file database, determining cache files stored in the memory card according to the file information and then performing cleaning. However, sometimes, the following case may occur that file information matching the characteristic information of the files in the memory card cannot be found in the cache file database, and the files may still be cache files.

Therefore, in order to perform more accurate searches and cleaning that avoid missing cache files, in one embodiment of the present application, the processor 530 is further used to:

1. When file information matching the characteristic information is not found in the cache file database, determine APPs associated with the characteristic information according to the characteristic information.

2. Acquire, when the APP associated with the characteristic information operates, the number of times that the APP uses files in the memory card corresponding to the characteristic information within a prescribed time.

3. According to the acquired number of times, determine whether the files in the memory card corresponding to the characteristic information are cache files.

4. When it is determined that the files in the memory card corresponding to the characteristic information are cache files, write file information of the files corresponding to the characteristic information into the cache file database.

That is, the cache file database is updated, so that the file information included in the cache file database is more comprehensive, so as to avoid missing in a subsequent search of the cache files.

When the file information matching the characteristic information is not found from the cache file database, in order to further accurately determine whether the files are cache files, in one embodiment of the present application, the processor 530 also can determine whether types of the files in the memory card corresponding to the characteristic information are types of the cache files. Generally, for example, the possibility is high that files of types such as image, video and audio are cache files. The processor 530 determines, when the acquired number of times exceeds a preset threshold, and types of the files in the memory card corresponding to the characteristic information are types of the cache files, that the files in the memory card corresponding to the characteristic information are cache files, thereby improving accuracy of determination of cache files, avoiding incorrect determination or missing determination, so that in subsequent cleaning, effective utilization of storage resource is ensured, and normal execution of the APP or execution efficiency of the APP is also ensured.

In one embodiment of the present application, optionally, the characteristic information extracted by the processor 530 includes installation file names of APPs and storage paths of the files. File information includes installation file names of APPs which cache files that can be stored in the memory card belong to and storage paths of the cache files that can be stored in the memory card. In this way, the processor 530 is used for, when installation file names identical to the extracted installation file names of APPs and storage paths identical to the extracted storage paths of the files are not found from the cache file database, determining APPs associated with the characteristic information according to the characteristic information.

According to the mobile terminal in this embodiment of the present application, cache files in a memory card (such as cache files stored in an SD card installed on a mobile terminal) can be identified and found, and are cleaned, which can effectively avoid that the cache files continuously occupy storage space of the memory card, so as to enhance utilization of the storage space of the memory card, thereby enhancing system operating performance of the mobile terminal. Moreover, the mobile terminal provided in this embodiment of the present application can, while cleaning the system caches, clean cache files stored in a memory card, so as to enable cleaning of the cache files to be more thorough. Besides, the mobile terminal in this embodiment of the present application can, based on each APP, classify cache files placed in a memory card according to uses, and display the cache files on a terminal interface, and therefore, the user can complete cleaning of caches of the SD card of the APP cleanly according to actual needs.

In order to implement the above embodiments, the present application further provides an application.

The application is used for performing the method for cleaning files according to any one of the above embodiments when operating.

According to the application in this embodiment of the present application, cache files in a memory card (such as cache files stored in an SD card installed on a mobile terminal) can be identified and found, and are cleaned, which can effectively avoid that the cache files continuously occupy storage space of the memory card, so as to enhance utilization of the storage space of the memory card, thereby enhancing system operating performance of the mobile terminal. Moreover, the mobile terminal provided in this embodiment of the present application can, while cleaning the system caches, clean cache files stored in a memory card, so as to enable cleaning of the cache files to be more thorough. Besides, the mobile terminal in this embodiment of the present application can, based on each APP, classify cache files placed in a memory card according to uses, and display the cache files on a terminal interface, and therefore, the user can complete cleaning of caches of the SD card of the APP cleanly according to actual needs.

In order to implement the above embodiments, the present application further provides a storage medium.

The storage medium is used for storing an application, where the application is used for performing the method for cleaning files according to any one of the above embodiments when operating.

Figure 6:
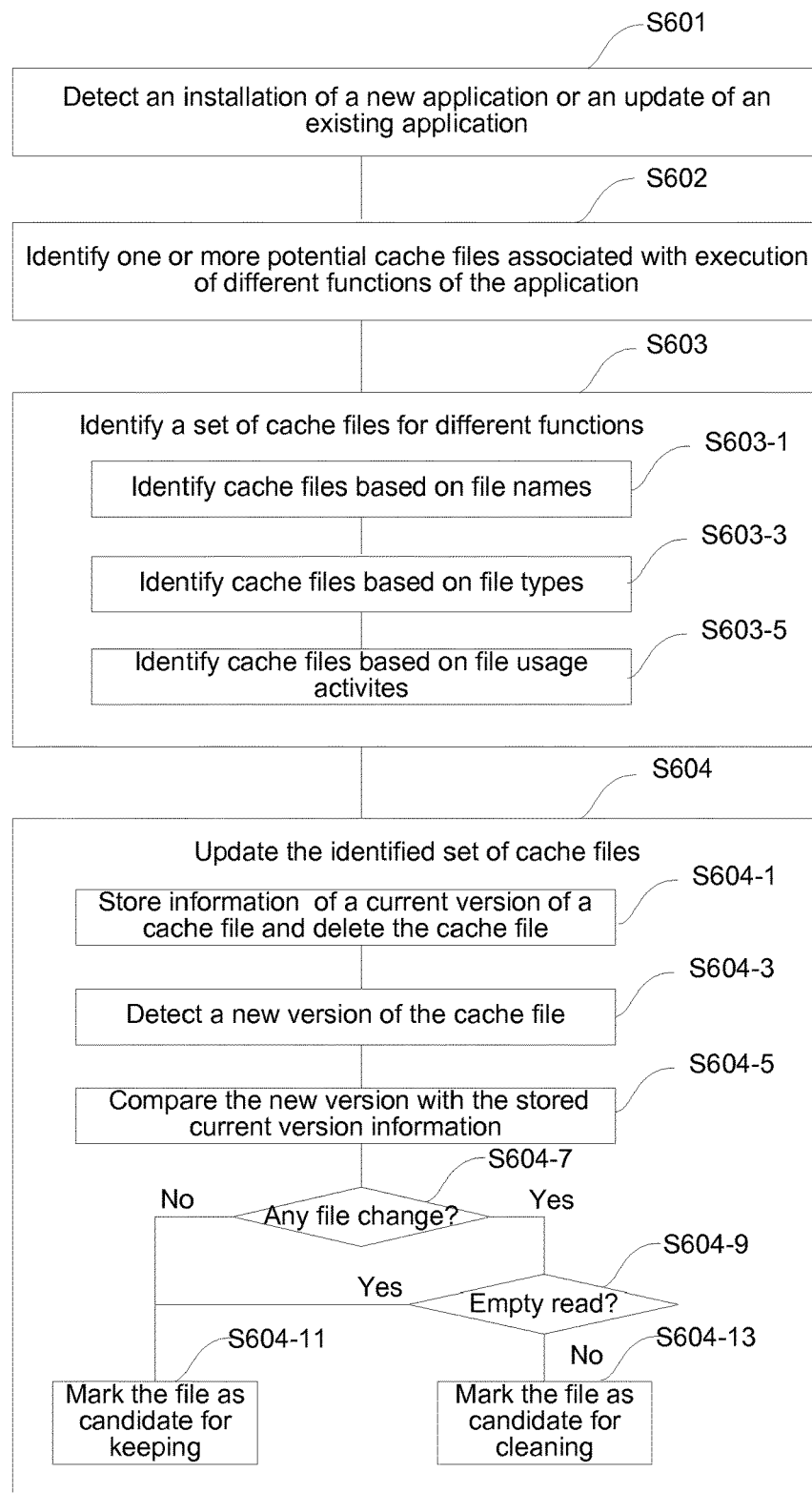
FIG. 6 is a flow chart of a method for identifying cache files according to some embodiments of the present application.

FIG. 6 is a flow chart of a method for identifying cache files according to some embodiments of the present application. As noted above, an application may store cache files in a memory card of a mobile terminal. It is possible to identify what cache files are generated by the application by executing functions of the application and monitoring the status of files generated by the application. At S601, the mobile terminal first detects an installation of a new application or an update of an existing application. A new application may generate its own cache files to support different functions. When an existing application is updated, it may also generate new cache files to support new functions or modified functions. At S602, the mobile terminal identifies one or more potential cache files associated with execution of different functions of the application. In some embodiments, the mobile terminal invokes a special API of the application in order to execute the different functions in the background and monitors the creation/modification/deletion of files in the file folders associated with the application. Note that not every file generated by the application would be a cache file. Rather, some of the potential cache files may need to be kept for future usage or better performance. At S603, the mobile terminal identifies a set of cache files for different functions associated with an application. As noted above, there are different criteria for determining whether a file is a cache file (which can be deleted to save space for other applications without adversely affecting the performance of the application). For example, the mobile terminal checks the file name of a potential cache file and determines whether the file name satisfies one of a predefine file name pattern associated with cache files (S603-1). The mobile terminal also checks the file type of a potential cache file and determines whether this file type is a common file type used as cache files (S603-3). Sometimes, the mobile terminal checks the file usage activity of a potential cache file to determine whether this file is a cache file or not (S603-5). For example, a file that is frequently modified by the application may not be a cache file eve if it has the file name or file type corresponding to cache files. The mobile terminal determines which criteria need to be met for a file to be treated as a cache file.

In some embodiments, the mobile terminal may revisit and update the initially identified set of cache files based on further information (S604). For each cache file selected from the identified set of cache files, the mobile terminal stores information of a current version of the cache file and then deletes the cache file from the mobile terminal (S604-1). The information of the current version may include the file name, file type, file size, and a representation of the file content (e.g., a digital fingerprint derived from the file content). Subsequently, the mobile terminal detects a new version of the cache file (S604-3) in the same file folder. The mobile terminal then compares the two versions of the cache file (S604-5) and determines whether there is any change to the file (S604-7). For example, the cache file may be marked for cleaning if there is a change to the file size or the file content between the two versions. Conversely, the mobile terminal may mark the file as candidate for keeping (S604-11) if there is no change between the two versions of the cache file. For example, the file of an image icon should remain the same between two different versions. In this case, it may be better to keep the image icon file in the file folder since the application may need to use the same icon repeatedly. Cleaning the image icon file from the mobile terminal (e.g., the SD card) would probably result in a waste of time for downloading the same file from a remote server. In some embodiments, the application may first read the current version of the cache file and then make changes to the file incrementally. If the current version of the cache file has been deleted, the application may encounter an empty read of the file folder (S604-9). In this case, the cache file may need to be marked as a candidate for keeping for future use. If the cache file does not fall into the two patterns, the mobile terminal may mark the file as a candidate for cleaning (S604-13).

Figure 7:
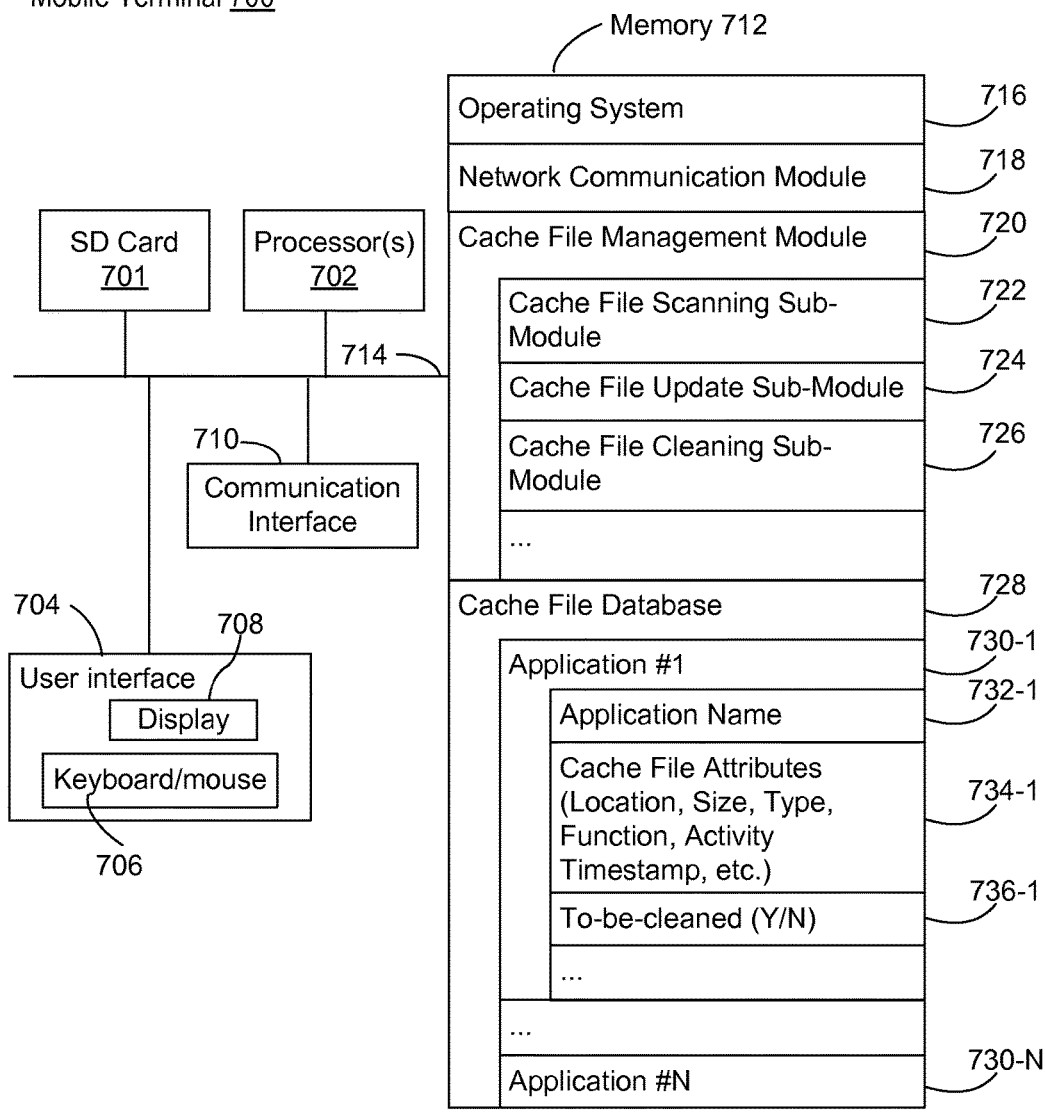
FIG. 7 is a block diagram of components of a mobile terminal according to some embodiments of the present application.

FIG. 7 is a block diagram of components of a mobile terminal according to some embodiments of the present application. The mobile terminal 700 includes one or more processors 702 for executing modules, programs and/or instructions stored in memory 712 and thereby performing predefined operations; one or more network or other communications interfaces 710; memory 712; and one or more communication buses 714 for interconnecting these components. In some embodiments, the mobile terminal 700 includes a user interface 704 comprising a display device 708 and one or more input devices 706 (e.g., keyboard or mouse or a touchscreen as shown in FIGS. 8A-8C), and one or more SD cards 701 for storing cache files.

Figure 8A:
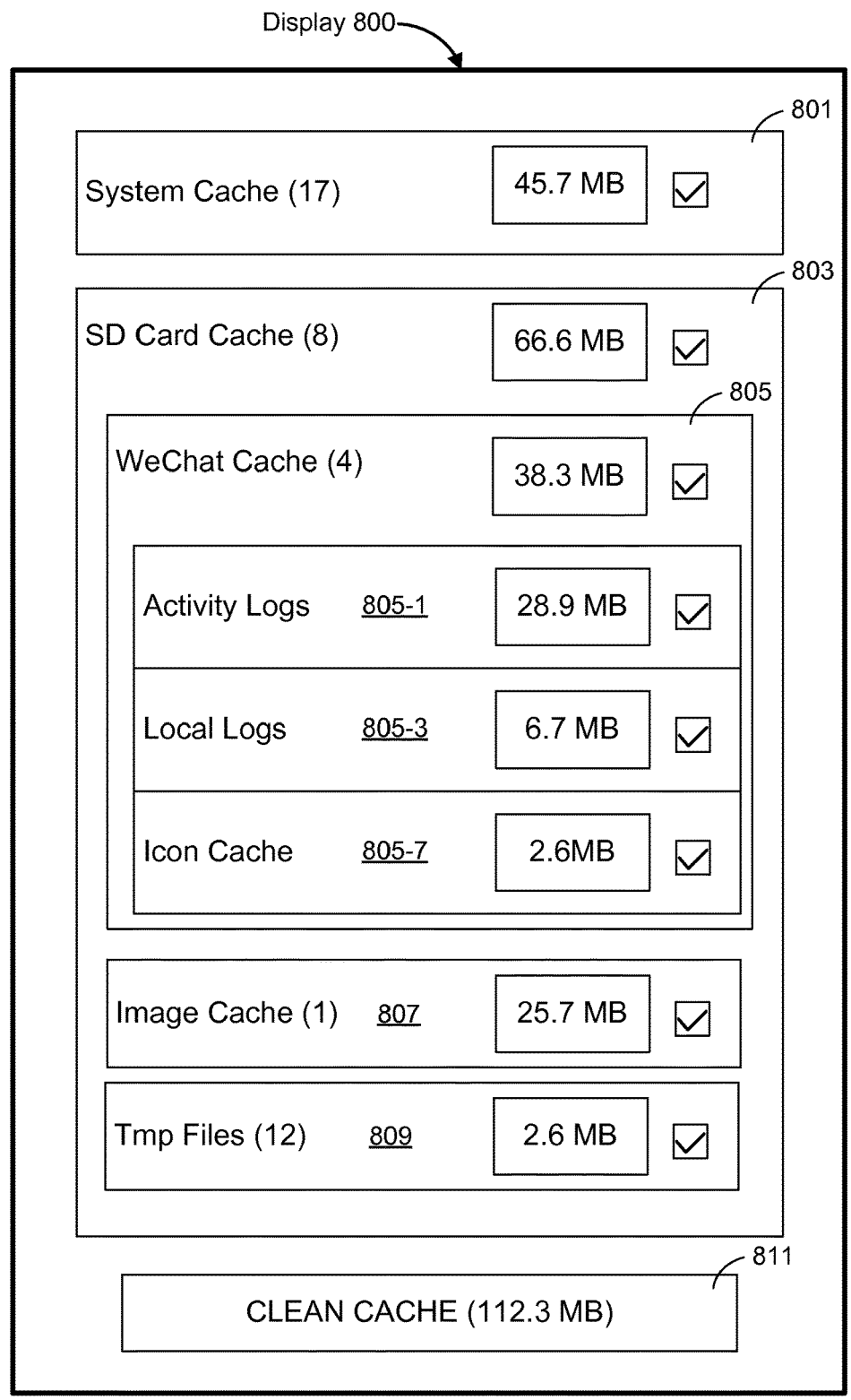
FIGS. 8A-8C are exemplary screenshots illustrative of how a mobile terminal performs file cleaning operations in response to user instructions according to some embodiments of the present application.
Figure 8B:
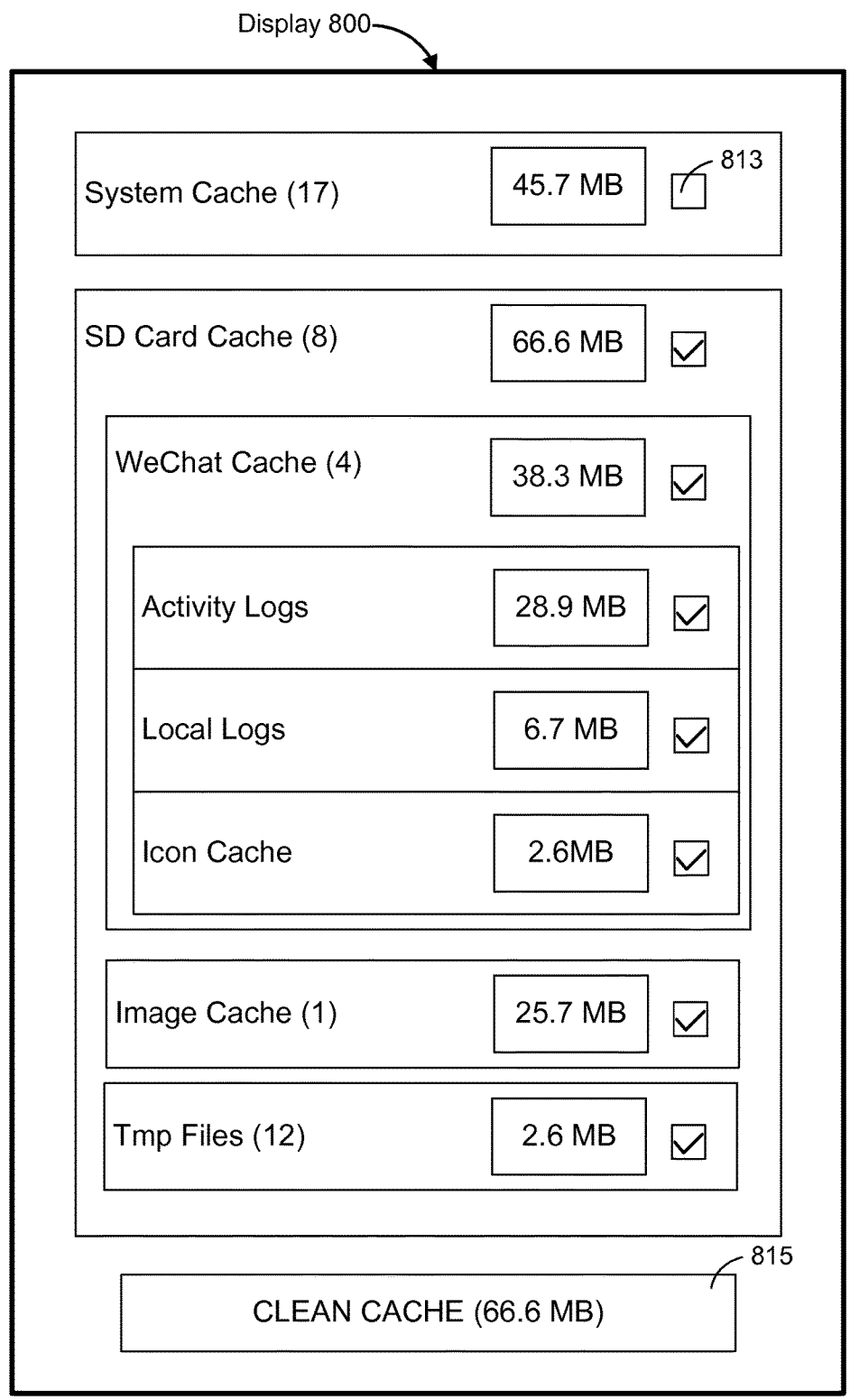
Figure 8C:
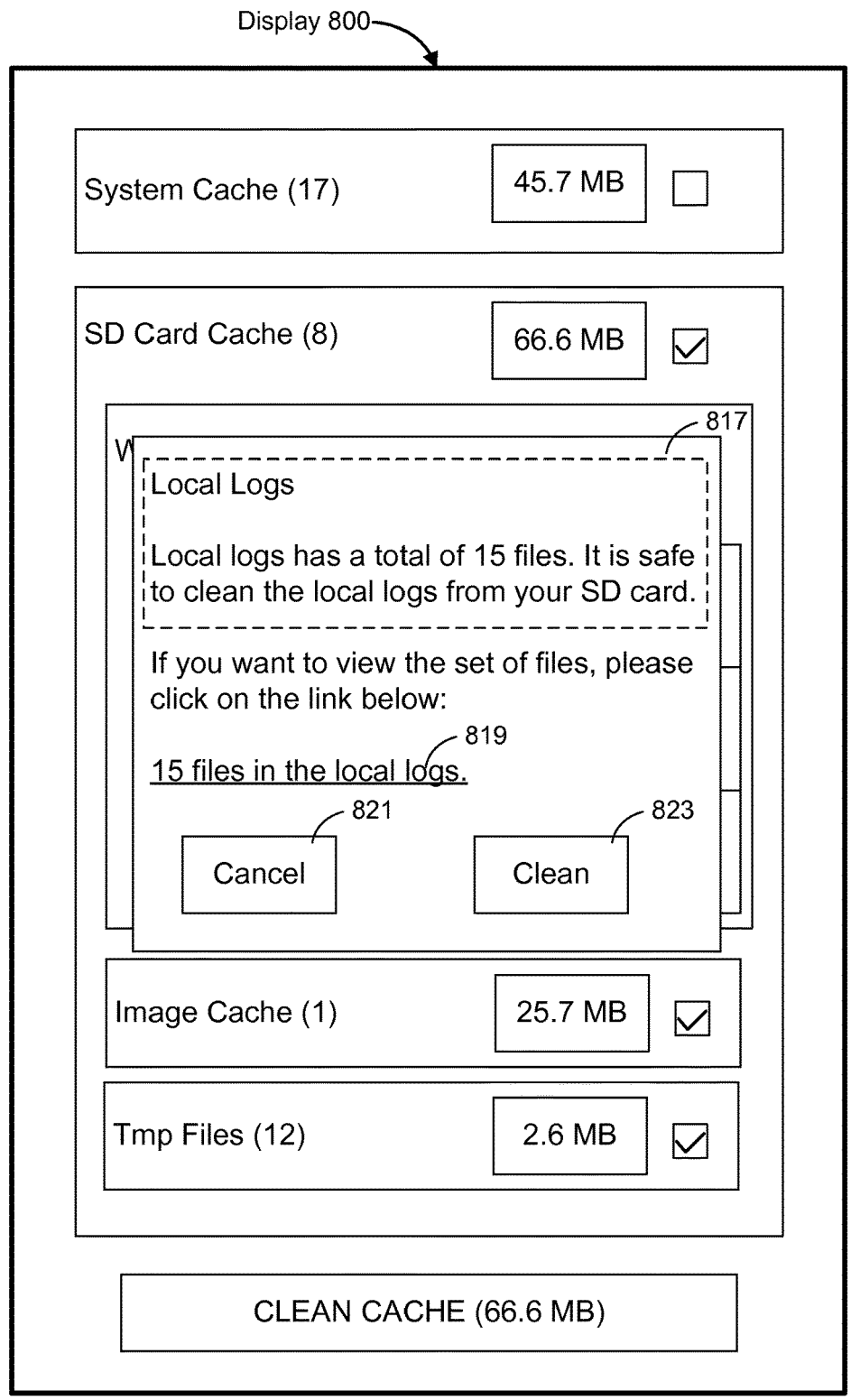

In some embodiments, the memory 712 includes high-speed random access memory, such as DRAM, SRAM, DDR RAM or other random access solid state memory devices. In some embodiments, memory 712 includes non-volatile memory, such as one or more magnetic disk storage devices, optical disk storage devices, flash memory devices, or other non-volatile solid state storage devices. In some embodiments, memory 712 includes one or more storage devices remotely located from the processor(s) 702. Memory 712, or alternately one or more storage devices (e.g., one or more nonvolatile storage devices) within memory 712, includes a non-transitory computer readable storage medium. In some embodiments, memory 712 or the computer readable storage medium of memory 712 stores the following programs, modules and data structures, or a subset thereof:

- an operating system 716 that includes procedures for handling various basic system services and for performing hardware dependent tasks;
- a network communications module 718 that is used for connecting the mobile terminal 700 to other computers (e.g., a remote server) via the communication network interfaces 710 and one or more communication networks (wired or wireless), such as the Internet, other wide area networks, local area networks, metropolitan area networks, etc.;
- a cache file management module 720 for managing cache files as described above, the cache file management module 720 further including a cache file scanning sub-module 722 and a cache file update module 724 as described above in connection with, e.g., FIG. 6 and a cache file cleaning sub-module 726 as described above in connection with FIG. 1 and as described below in connection with FIGS. 8A-8C; and
- a cache file database 728 as described above in connection with FIG. 1, the cache file database 728 further including multiple entries and each entry representing an application (730-1, ..., 730-N) including an application name 732-1 (or installation file name), file characteristic information such as multiple file attributes 734-1 (including file location, file size, file type, file function, and file usage activity timestamp, etc.), and a flag 736-1 indicating whether the cache file can be cleaned or not as described above in connection with FIG. 6.

FIGS. 8A-8C are exemplary screenshots illustrative of how a mobile terminal performs file cleaning operations in response to user instructions according to some embodiments of the present application. In this example, the mobile terminal includes a touchscreen for receiving user instructions and rendering file cleaning results based on the user instructions.

For example, the mobile terminal receives a file cleaning instruction from a user of the mobile terminal. In response to the file cleaning instruction, the mobile terminal identifies cache files based on their associated information and past user activities on the cache files. As described above, information about the cache files is managed by a cache file database in the mobile terminal and the cache file database is automatically updated when a new application is installed or an existing application is updated or there is a predefined time lapse since the last update to the cache file database. For example, the cache file database stores an entry for each cache file, the entry including an application name, one or more file attributes, and a file cleaning recommendation based on the file attributes. In response to the file cleaning instruction, the mobile terminal queries the cache file database to identify those cache files that can be cleaned and then groups them into multiple cache file categories. As noted above, different applications in the mobile terminal may generate different cache files and even different functions of the same application may generate different cache files. An important feature of the present application is that the cache file cleaning operation can be refined to target at a particular application's associated cache files or even a particular function's cache files. In this case, the different cache file categories may correspond to different applications and one particular cache file category may be further divided into multiple sub-categories, each sub-category corresponding to a respective function of the application. Next, the mobile terminal displays information of the multiple cache file categories on the display, each cache file category having an associated file cleaning option.

As shown in FIG. 8A, the display 800 includes multiple regions. The region 801 represents 17 system cache files with a total size of 45.7 MB and there is a checkbox in the region 801 so that the user can determine whether the system cache files should be cleaned or not. The region 803 includes 8 SD card cache file categories with a total size of 66.6 MB. As a result, the cache file cleaning button 811 indicates that, if pressed by the user, a total of 112.3 MB of memory space will be freed up for other applications to use. Within the region 803, there are three sub-regions 805, 807, and 809. Each sub-region corresponds to one category of cache files associated with a particular application. The sub-region 805 further includes three entries (805-1, 805-3, and 805-7), each entry corresponding to cache files associated with a particular function of the WeChat application. Note that each region, sub-region, or individual entry has an associated checkbox so that a user can determine whether the cache files associated with the corresponding region, sub-region or individual entry should be cleaned or not. FIG. 8B depicts the status of the cache file cleaning operation when the user unselects the checkbox 813 in the region 801. Note that the total size of the cache files to be cleaned in the cache file cleaning button 815 drops to 66.6 MB. In response to a user selection of the cache file cleaning button 811 or 815, the mobile terminal cleans the corresponding category or sub-category of cache files from the system memory and/or the memory card.

In some embodiments, the mobile terminal detects a user selection of one of the cache file categories (or cache file sub-categories). In response, the mobile terminal displays the aggregated information of the cache files in the user-selected cache file category (or cache file sub-category) and cleans the cache files in accordance with a further user instruction to clean the cache file category (or cache file sub-category). FIG. 8C depicts a pop-up window 817 in the display 800. Note that the dashed line box displays the aggregated information in the "Local Logs" sub-category of the WeChat application, e.g., the total number of 15 files, and an operation recommendation for the user to consider. In some embodiments, the aggregated information may also include a total size of the cache files in the cache file category (or cache file sub-category). In some embodiments, the pop-up window 817 further includes a link 819 to the 15 individual cache files in the sub-category. In response to a user selection of the link 819, the mobile terminal brings up a list of the 15 files (including their names, location, and sizes) on the display. The user can clean the cache files in the sub-category by selecting the "Clean" button 823 or skip the operation by selecting the "Cancel" button 821 accordingly. In other words, the mobile terminal allows the user to take file cleaning actions on individual functions of an application.

While particular embodiments are described above, it will be understood it is not intended to limit the present application to these particular embodiments. Conversely, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context cleanly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for cleaning files stored in a mobile terminal, comprising:
at the mobile terminal having one or more processors, memory and a display:
receiving a file cleaning instruction from a user;
in response to receiving the file cleaning instruction:
identifying a plurality of cache files as candidates for deletion, based on the plurality of cache files' associated information and past file usage activities on the plurality of cache files;
grouping the identified plurality of cache files and their associated information into multiple cache file categories;
displaying information of the multiple cache file categories on the display, including concurrently displaying respective identifiers of the multiple cache file categories and displaying an associated file cleaning option with the respective identifier for each cache file category of the multiple cache file categories; and
cleaning respective cache files belonging to at least one of the multiple cache file categories from the mobile terminal in accordance with a user selection of the file cleaning option associated with said at least one cache file category, while maintaining respective cache files of one or more cache file categories for which the associated file cleaning options are unselected, wherein the plurality of cache files' associated information is managed by a cache file database in the mobile terminal and the cache file database is automatically updated when a new software application program is installed on the mobile terminal, and wherein the cache file database stores an entry for a respective cache file in the cache file database with a respective flag indicating whether a file cleaning recommendation for the respective cache file is to delete the respective cache file or to keep the respective cache file in association with a file cleaning operation, wherein the method further includes generating the file cleaning recommendation for the respective cache file in the cache file database, including:
deleting the respective cache file from a memory card of the mobile terminal;
after deleting the respective cache file from the memory card of the mobile terminal, monitoring behavior of an application corresponding to the respective cache file that has been deleted to determine whether the memory card has a new file identical to the respective cache file that has been deleted when the application operates;
in accordance with a determination that the memory card has a new file identical to the respective cache file that has been deleted when the application operates, generating the file cleaning recommendation for keeping the respective cache file in association with a file cleaning operation; and
in accordance with a determination that the memory card does not have a new file identical to the respective cache file when the application operates, generating the file cleaning recommendation for deleting the respective cache file in association with a file cleaning operation.

2. The method of claim 1, further comprising:
detecting an installation of a new application or an update of an existing application;
identifying one or more potential cache files associated with execution of different functions of the application; and
identifying, among the potential cache files, a set of cache files for the application based on their file name, file types, and file usage activities.

3. The method of claim 2, wherein a potential cache file is deemed to be a cache file when the file has at least one of a predefined set of file name patterns, one of a predefined set of file types, and one of a predefined set of file usage activity patterns.

4. The method of claim 2, further comprising:
selecting a first cache file from the identified set of cache files;
storing information of a current version of the first cache file and deleting the first cache file from the mobile terminal;
after detecting a new version of the first cache file, comparing the new version of the first cache file with the stored information of the current version of the first cache file; and
marking the first cache file as a candidate to be kept in the identified set of cache files in accordance with a determination that there is no change to the new version of the first cache file or there is an empty read of the first cache file from the corresponding application.

5. The method of claim 1, further comprising:
detecting a user selection of one of the multiple cache file categories;
in response to detecting the user selection of a first cache file category:
displaying aggregated information of one or more cache files in the first cache file category;
cleaning the cache files in the first cache file category from the mobile terminal in accordance with a user instruction to clean the first cache file category.

6. The method of claim 1, wherein a plurality of cache files within a respective cache file category are associated with one application installed on the mobile terminal and the plurality of cache files are further divided into multiple sub-categories, each sub-category corresponding to a respective function of the application.

7. The method of claim 6, wherein each sub-category has an associated file cleaning option such that a user can select one or more of the sub-categories of cache files to be cleaned from the mobile terminal.

8. The method of claim 1, wherein at least one of the multiple cache file categories corresponds to one or more cache files stored in a SD card of the mobile terminal.

9. A mobile terminal comprising:
a display;
one or more processors;
memory; and
one or more program modules stored in the memory and to be executed by the one or more processors, the one or more program modules including instructions for:
receiving a file cleaning instruction from a user;
in response to receiving the file cleaning instruction:
identifying a plurality of cache files as candidates for deletion, based on the plurality of cache files' associated information and past file usage activities on the plurality of cache files;
grouping the identified plurality of cache files and their associated information into multiple cache file categories;
displaying information of the multiple cache file categories on the display, including concurrently displaying respective identifiers of the multiple cache file categories and displaying an associated file cleaning option with the respective identifier for each cache file category of the multiple cache file categories; and
cleaning respective cache files belonging to at least one of the multiple cache file categories from the mobile terminal in accordance with a user selection of the file cleaning option associated with said at least one cache file category, while maintaining respective cache files of one or more cache file categories for which the associated file cleaning options are unselected, wherein the plurality of cache files' associated information is managed by a cache file database in the mobile terminal and the cache file database is automatically updated when a new software application program is installed on the mobile terminal, and wherein the cache file database stores an entry for a respective cache file in the cache file database with a respective flag indicating whether a file cleaning recommendation for the respective cache file is to delete the respective cache file or to keep the respective cache file in association with a file cleaning operation, wherein the program modules further include instructions for generating the file cleaning recommendation for the respective cache file in the cache file database, including:
deleting the respective cache file from a memory card of the mobile terminal;
after deleting the respective cache file from the memory card of the mobile terminal, monitoring behavior of an application corresponding to the respective cache file that has been deleted to determine whether the memory card has a new file identical to the respective cache file that has been deleted when the application operates;
in accordance with a determination that the memory card has a new file identical to the respective cache file that has been deleted when the application operates, generating the file cleaning recommendation for keeping the respective cache file in association with a file cleaning operation; and
in accordance with a determination that the memory card does not have a new file identical to the respective cache file when the application operates, generating the file cleaning recommendation for deleting the respective cache file in association with a file cleaning operation.

10. The mobile terminal of claim 9, wherein the one or more program modules further include instructions for:
detecting an installation of a new application or an update of an existing application;
identifying one or more potential cache files associated with execution of different functions of the application; and
identifying, among the potential cache files, a set of cache files for the application based on their file name, file types, and file usage activities.

11. The mobile terminal of claim 10, wherein the one or more program modules further include instructions for:
selecting a first cache file from the identified set of cache files;
storing information of a current version of the first cache file and deleting the first cache file from the mobile terminal;
after detecting a new version of the first cache file, comparing the new version of the first cache file with the stored information of the current version of the first cache file; and
marking the first cache file as a candidate to be kept in the identified set of cache files in accordance with a determination that there is no change to the new version of the first cache file or there is an empty read of the first cache file from the corresponding application.

12. The mobile terminal of claim 9, wherein the one or more program modules further include instructions for:
detecting a user selection of one of the multiple cache file categories;
in response to detecting the user selection of a first cache file category:
displaying aggregated information of one or more cache files in the first cache file category;
cleaning the cache files in the first cache file category from the mobile terminal in accordance with a user instruction to clean the first cache file category.

13. The mobile terminal of claim 9, wherein a plurality of cache files within a respective cache file category are associated with one application installed on the mobile terminal and the plurality of cache files are further divided into multiple sub-categories, each sub-category corresponding to a respective function of the application.

14. The mobile terminal of claim 9, wherein at least one of the multiple cache file categories corresponds to one or more cache files stored in a SD card of the mobile terminal.

15. A non-transitory computer readable medium used in conjunction with a mobile terminal, the mobile terminal having a display, one or more processors, and memory, the computer readable medium comprising instructions for:
receiving a file cleaning instruction from a user;
in response to receiving the file cleaning instruction:
identifying a plurality of cache files as candidates for deletion, based on the plurality of cache files' associated information and past file usage activities on the plurality of cache files;

grouping the identified plurality of cache files and their associated information into multiple cache file categories;

displaying information of the multiple cache file categories on the display, including concurrently displaying respective identifiers of the multiple cache file categories and displaying an associated file cleaning option with the respective identifier for each cache file category of the multiple cache file categories; and cleaning respective cache files belonging to at least one of the multiple cache file categories from the mobile terminal in accordance with a user selection of the file cleaning option associated with said at least one cache file category, while maintaining respective cache files of one or more cache file categories for which the associated file cleaning options are unselected, wherein the plurality of cache files' associated information is managed by a cache file database in the mobile terminal and the cache file database is automatically updated when a new software application program is installed on the mobile terminal, and wherein the cache file database stores an entry for a respective cache file in the cache file database with a respective flag indicating whether a file cleaning recommendation for the respective cache file is to delete the respective cache file or to keep the respective cache file in association with a file cleaning operation, wherein the computer-readable medium further includes instructions for generating the file cleaning recommendation for the respective cache file in the cache file database, including:

deleting the respective cache file from a memory card of the mobile terminal;

after deleting the respective cache file from the memory card of the mobile terminal, monitoring behavior of an application corresponding to the respective cache file that has been deleted to determine whether the memory card has a new file identical to the respective cache file that has been deleted when the application operates;

in accordance with a determination that the memory card has a new file identical to the respective cache file that has been deleted when the application operates, generating the file cleaning recommendation for keeping the respective cache file in association with a file cleaning operation; and in accordance with a determination that the memory card does not have a new file identical to the respective cache file when the application operates, generating the file cleaning recommendation for deleting the respective cache file in association with a file cleaning operation.

16. The non-transitory computer readable medium of claim 15, wherein the one or more program modules further include instructions for:

selecting a first cache file from the identified set of cache files;

storing information of a current version of the first cache file and deleting the first cache file from the mobile terminal;

after detecting a new version of the first cache file, comparing the new version of the first cache file with the stored information of the current version of the first cache file; and marking the first cache file as a candidate to be kept in the identified set of cache files in accordance with a determination that there is no change to the new version of the first cache file or there is an empty read of the first cache file from the corresponding application.

17. The non-transitory computer readable medium of claim 15, wherein the one or more program modules further include instructions for:

detecting a user selection of one of the multiple cache file categories;

in response to detecting the user selection of a first cache file category:

displaying aggregated information of one or more cache files in the first cache file category;

cleaning the cache files in the first cache file category from the mobile terminal in accordance with a user instruction to clean the first cache file category.

18. The non-transitory computer readable medium of claim 15, wherein a plurality of cache files within a respective cache file category are associated with one application installed on the mobile terminal and the plurality of cache files are further divided into multiple sub-categories, each sub-category corresponding to a respective function of the application.

19. The non-transitory computer readable medium of claim 15, wherein at least one of the multiple cache file categories corresponds to one or more cache files stored in a SD card of the mobile terminal.

* * * * *